United States Patent
Kwak et al.

(10) Patent No.: US 11,614,818 B2
(45) Date of Patent: *Mar. 28, 2023

(54) DISPLAY DEVICE

(71) Applicant: Samsung Display Co., Ltd., Yongin-si (KR)

(72) Inventors: Nayun Kwak, Cheonan-si (KR); Jongseok Kim, Yongin-si (KR); Chiwook An, Hwaseong-si (KR); Yong-hwan Park, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,787

(22) Filed: May 30, 2022

(65) Prior Publication Data

US 2022/0291770 A1    Sep. 15, 2022

Related U.S. Application Data

(63) Continuation of application No. 17/343,664, filed on Jun. 9, 2021, now Pat. No. 11,347,341, which is a
(Continued)

(30) Foreign Application Priority Data

Jul. 29, 2016   (KR) ........................ 10-2016-0097484

(51) Int. Cl.
    *G06F 3/041*       (2006.01)
    *G06F 3/044*       (2006.01)
    *G02F 1/35*        (2006.01)

(52) U.S. Cl.
    CPC ............ *G06F 3/0412* (2013.01); *G06F 3/044* (2013.01); *G06F 3/0443* (2019.05);
(Continued)

(58) Field of Classification Search
    CPC .... G06F 3/0412; G06F 3/04164; G06F 3/044; G06F 3/0443; G06F 3/0446;
(Continued)

(56) References Cited

U.S. PATENT DOCUMENTS 8,893,565 B2    11/2014   White et al.
9,318,427 B2    4/2016    Youn et al.
(Continued)

FOREIGN PATENT DOCUMENTS

CN     103748538      4/2014
CN     104272232      1/2015
(Continued)

OTHER PUBLICATIONS

The Extended European Search Report dated Dec. 5, 2017, issued in European patent Application No. 17182444.4.
(Continued)

*Primary Examiner* — Jonathan A Boyd
(74) *Attorney, Agent, or Firm* — H.C. Park & Associates, PLC

(57) ABSTRACT

A display device including a display panel including a flat area including a first display area and a first peripheral area adjacent to the first display area and a bending area including a second display area and a second peripheral area adjacent to the second display area, and an input sensing unit on the display panel. The input sensing unit includes first touch sensors having a mesh shape, extending in a first direction parallel to a bending axis of the bending area, and arranged in a second direction crossing the first direction, second touch sensors having a mesh shape, extending in the second direction, and arranged in the first direction, first connection electrodes respectively connected to ends of the first touch sensors, second connection electrodes respectively connected to ends of the second touch sensors, and touch signal
(Continued)

lines connected to the first connection electrodes and the second connection electrodes.

8 Claims, 25 Drawing Sheets

Related U.S. Application Data continuation of application No. 16/544,041, filed on Aug. 19, 2019, now Pat. No. 11,036,340, which is a continuation of application No. 15/653,202, filed on Jul. 18, 2017, now Pat. No. 10,409,433.

(52) U.S. Cl.
CPC ........ G06F 3/0446 (2019.05); G06F 3/04164 (2019.05); *G02F 1/3501* (2013.01); *G06F 2203/04102* (2013.01); *G06F 2203/04112* (2013.01)

(58) Field of Classification Search
CPC . G06F 2203/04102; G06F 2203/04112; G02F 1/3501; H01L 27/323; H01L 27/3276
See application file for complete search history.

(56) References Cited

U.S. PATENT DOCUMENTS

| | | | |
|---|---|---|---|
| 9,400,576 | B2 | 7/2016 | Chen et al. |
| 9,483,132 | B2 | 11/2016 | Her et al. |
| 9,740,317 | B2 | 8/2017 | Koshimizu et al. |
| 10,156,944 | B2 | 12/2018 | Lee |
| 2009/0303189 | A1 | 12/2009 | Grunthaner et al. |
| 2011/0298731 | A1 | 12/2011 | Fu et al. |
| 2013/0063371 | A1* | 3/2013 | Lee ................ G06F 3/0412 345/173 |
| 2014/0084992 | A1 | 3/2014 | Chen et al. |
| 2014/0299361 | A1 | 10/2014 | Nakamura et al. |
| 2015/0160760 | A1 | 6/2015 | Sato |
| 2015/0277643 | A1 | 10/2015 | Kim |
| 2016/0011683 | A1* | 1/2016 | Koshimizu ........... G06F 3/041 345/173 |
| 2016/0141235 | A1 | 5/2016 | Lin et al. |
| 2016/0202831 | A1* | 7/2016 | Kim ................ G06F 3/0412 345/173 |
| 2016/0209971 | A1 | 7/2016 | Kim et al. |
| 2017/0013707 | A1 | 1/2017 | Lyon et al. |
| 2017/0033312 | A1 | 2/2017 | Kim et al. |
| 2017/0192574 | A1* | 7/2017 | Koike ................ G06F 3/047 |
| 2018/0335918 | A1 | 11/2018 | Wang et al. |

FOREIGN PATENT DOCUMENTS

| | | | |
|---|---|---|---|
| CN | 104423715 | | 3/2015 |
| CN | 105027043 | | 11/2015 |
| CN | 105051658 | | 11/2015 |
| CN | 105144270 | | 12/2015 |
| CN | 105786237 | | 7/2016 |
| EP | 2980680 | | 2/2016 |
| JP | 2016076146 | | 5/2016 |
| KR | 10-2016-0037770 | A | 4/2016 |
| KR | 20160086489 | | 7/2016 |
| KR | 10-2017-0015629 | A | 2/2017 |
| TW | M488050 | | 10/2014 |
| TW | 201512933 | | 4/2015 |
| TW | 201604735 | | 2/2016 |
| TW | 201604752 | | 2/2016 |
| TW | 201610783 | | 3/2016 |
| WO | 2016-039047 | | 3/2016 |
| WO | WO-2016039047 | A1 * | 3/2016 ........... G06F 3/0412 |

OTHER PUBLICATIONS

Non-Final Office Action dated Sep. 20, 2018, in U.S. Appl. No. 15/653,202.
Final Office Action dated Jan. 11, 2019, in U.S. Appl. No. 15/653,202.
Advisory Action dated Mar. 28, 2019, in U.S. Appl. No. 15/653,202.
Notice of Allowance dated Jul. 24, 2019, in U.S. Appl. No. 15/653,202.
Extended European Search Report dated Jun. 9, 2020, issued in EP Patent Application No. 20167162.5.
Non-Final Office Action dated Sep. 16, 2019, in U.S. Appl. No. 16/544,041.
Final Office Action dated Apr. 20, 2020, in U.S. Appl. No. 16/544,041.
Notice of Allowance dated Aug. 21, 2020, in U.S. Appl. No. 16/544,041.
Notice of Allowance dated Feb. 18, 2021, in U.S. Appl. No. 16/544,041.
Notice of Allowance dated Apr. 28, 2021, in U.S. Appl. No. 16/544,041.
Notice of Allowance dated Feb. 2, 2022, in U.S. Appl. No. 17/343,664.

* cited by examiner

DISPLAY DEVICE

CROSS-REFERENCE TO RELATED APPLICATION

This application is a Continuation of U.S. patent application Ser. No. 17/343,664, filed on Jun. 9, 2021, which is a Continuation of U.S. patent application Ser. No. 16/544,041, filed on Aug. 19, 2019, which issued as U.S. Pat. No. 11,036,340, which is a Continuation of U.S. patent application Ser. No. 15/653,202, filed Jul. 18, 2017, which issued as U.S. Pat. No. 10,409,433, and which claims priority from and the benefit of Korean Patent Application No. 10-2016-0097484, filed on Jul. 29, 2016, each of which is hereby incorporated by reference for all purposes as if fully set forth herein.

BACKGROUND

Field

Exemplary embodiments of the invention relate to a display device. More particularly, exemplary embodiments of the invention relate to a display device including an input sensing unit.

Discussion of the Background

Electronic devices, such as a smart phone, a tablet computer, a notebook computer, a smart television, etc., have recently been developed. The electronic devices include a display device to provide information.

In recent years, display devices have included a touch sensing function for interaction with a user, in addition to a function of displaying an image through a display panel. The touch sensing function is used to check whether an object touches a screen and to obtain a touch coordinate in accordance with a user's finger or a touch pen making contact with or approaching the screen. The display device receives an image signal on the basis of the touch coordinate.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the invention provide a display device capable of preventing a signal line from fracturing in a bending area.

Additional aspects will be set forth in the detailed description which follows, and, in part, will be apparent from the disclosure, or may be learned by practice of the inventive concept.

An exemplary embodiment of the invention discloses a display device including a display panel and an input sensing unit disposed on the display panel. The display panel includes a flat area including a first display area and a first peripheral area adjacent to the first display area, and a bending area including a second display area and a second peripheral area adjacent to the second display area. The input sensing unit includes: a plurality of first touch sensors having a mesh shape, extending in a first direction parallel to a bending axis of the bending area, and arranged in a second direction crossing the first direction; a plurality of second touch sensors having a mesh shape, extending in the second direction, and arranged in the first direction; first connection electrodes respectively connected to ends of the first touch sensors; second connection electrodes respectively connected to ends of the second touch sensors; and a plurality of touch signal lines connected to the first connection electrodes and the second connection electrodes. At least one first connection electrode disposed in the bending area among the first connection electrodes includes a center portion and opposite edge portions, and one edge portion of the opposite edge portions includes a first edge and a second edge inclined with respect to the bending axis.

An exemplary embodiment of the invention also discloses a display device including a display panel and an input sensing unit disposed on the display panel. The display panel includes a flat area including a first display area and a first peripheral area adjacent to the first display area, and a bending area including a second display area and a second peripheral area adjacent to the second display area. The input sensing unit includes: a plurality of first touch sensors having a mesh shape, extending in a first direction parallel to a bending axis of the bending area, and arranged in a second direction crossing the first direction; a plurality of second touch sensors having a mesh shape, extending in the second direction, and arranged in the first direction; and a plurality of touch signal lines applying an electrical signal to the first touch sensors and the second touch sensors. The touch signal line disposed in the bending area among the touch signal lines includes an inclination portion inclined with the bending axis and a parallel portion parallel to the bending axis.

According to the above, first and second ends of a signal line disposed in the bending area and connected to the touch sensor may have a slope with respect to an axis perpendicular to the bending axis. That is, since the first end and the second end of the touch signal line are not perpendicular to the bending axis, the stress applied to the touch signal line may be reduced. As a result, the touch signal line may be prevented from being damaged in the bending area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
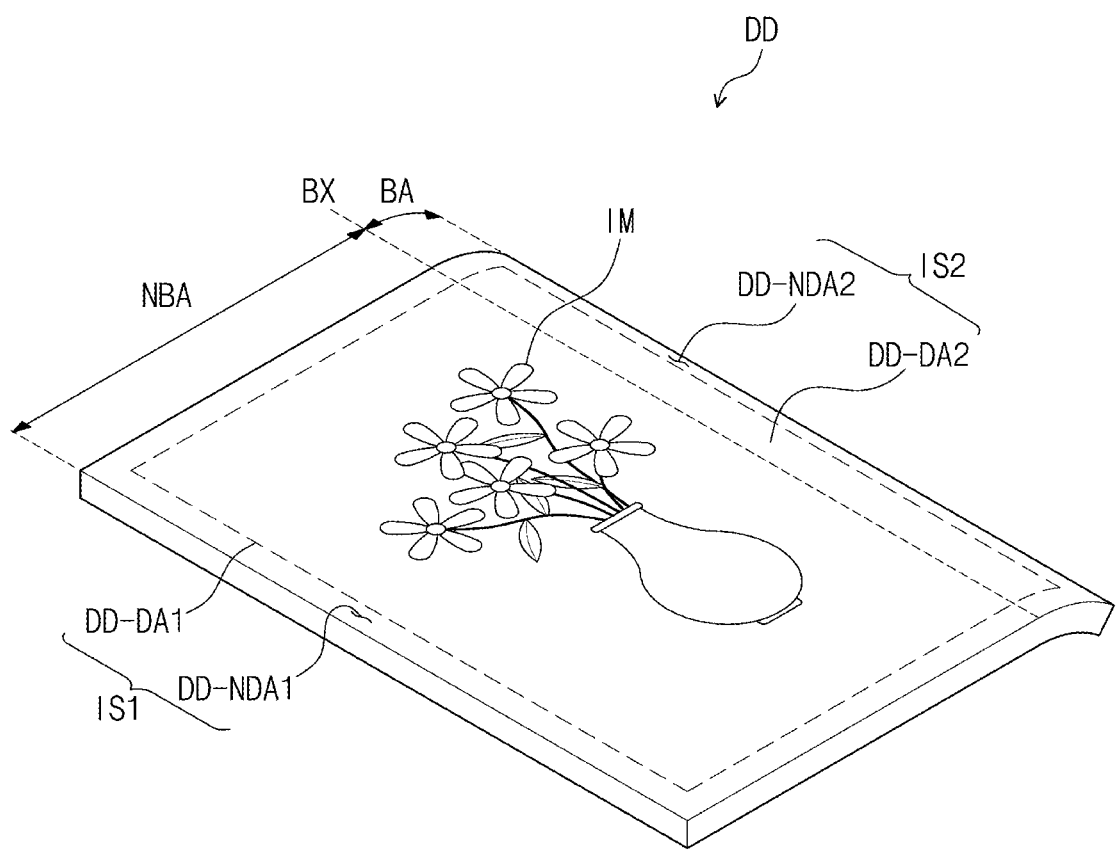
FIG. 1A is a perspective view showing a display device according to an exemplary embodiment of the invention.
Figure 1A:
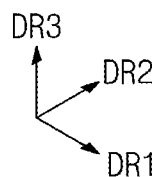

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
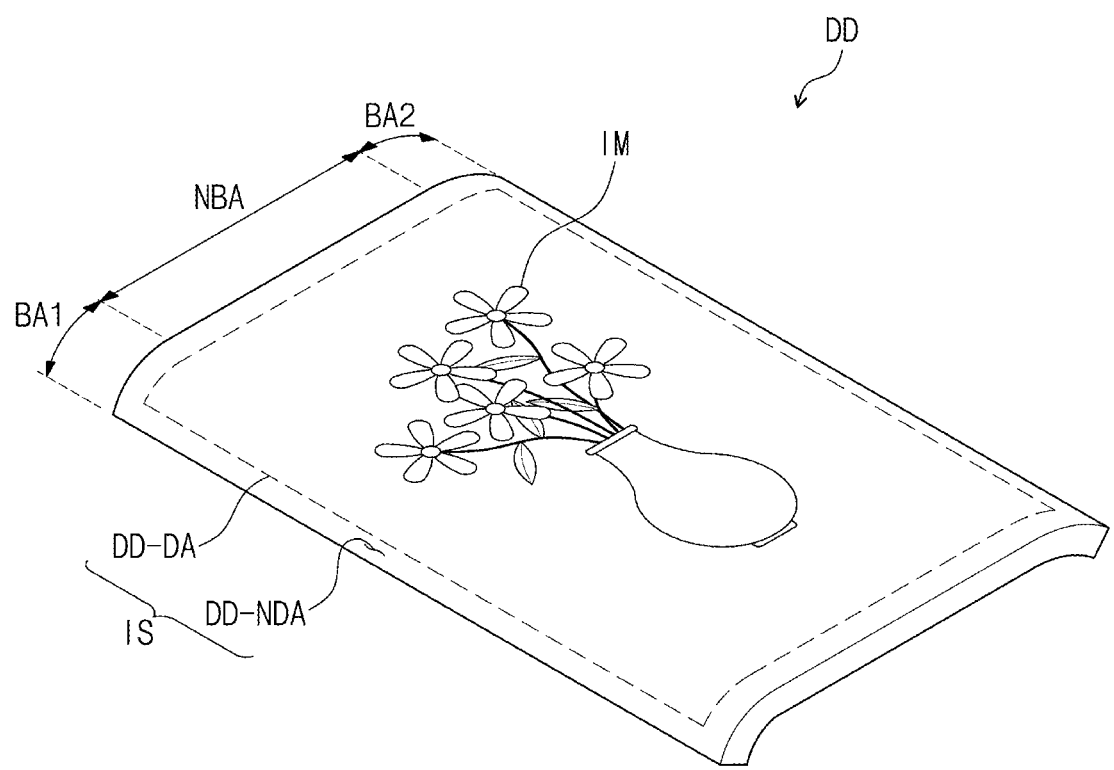
FIG. 1B is a perspective view showing a display device according to an exemplary embodiment of the invention.
Figure 1B:
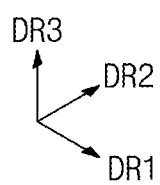

FIG. 1A is a perspective view showing a display device DD according to an exemplary embodiment of the present disclosure. FIG. 1B is a perspective view showing a display device DD according to an exemplary embodiment of the present disclosure.

FIGS. 1A and 1B show the display device DD applicable to a smart phone as a representative example. The flexible display device DD according to the present exemplary embodiment may be applied to electronic devices, such as a television set, a personal computer, a notebook computer, a car navigation unit, a game unit, a sound electronic device, a smart watch, a camera, etc., but it should not be limited thereto.

Referring to FIG. 1A, the display device DD includes a flat area NBA and a bending area BA, which are distinguished from each other with respect to a bending axis BX. The flat area NBA includes a first display surface IS1, and the bending area BA includes a second display surface IS2.

In detail, the flat area NBA includes a first display area DD-DA1 of the first display surface IS1 and a first peripheral area DD-NDA1 adjacent to the first display area DD-DA1. The bending area BA includes a second display area DD-DA2 of the second display surface IS2 and a second peripheral area DD-NDA2 adjacent to the second display area DD-DA2.

The first display area DD-DA1 is distinguished from the second display area DD-DA2 with respect to the bending axis BX. The first peripheral area DD-NDA1 is distinguished from the second peripheral area DD-NDA2 with respect to the bending axis BX. An image IM is displayed through the first display area DD-DA1 and the second display area DD-DA2.

In the flat area NBA, the first display surface IS1, in which the image IM is displayed, is substantially parallel to a surface defined by a first direction DR1 and a second direction DR2. A normal line direction of the display surface IS, i.e., a thickness direction of the display device DD, indicates a third direction DR3. In each member, a front surface (or an upper surface) is distinguished from a rear surface (or a lower surface) by the third direction DR3. However, the first to third directions DR1 to DR3 are relative to each other, and thus, the first to third directions DR1 to DR3 may be changed to any other directions. Hereinafter, first to third directions correspond to directions respectively indicated by the first to third directions DR1 to DR3, and thus, the first to third directions are assigned with the same reference numerals as those of the first to third directions DR1 to DR3.

Referring to FIG. 1B, the display device DD may include one flat area NBA and first and second bending areas BA1 and BA2 spaced apart from each other such that the flat area NBA is disposed between the first and second bending areas BA1 and BA2. The first and second bending areas BA1 and BA2 are bent from opposite ends of the flat area NBA in the second direction DR2.

Hereinafter, the display device DD configured to include one bending area BA, as shown in FIG. 1A, will be described in detail as a representative example.

Figure 2:
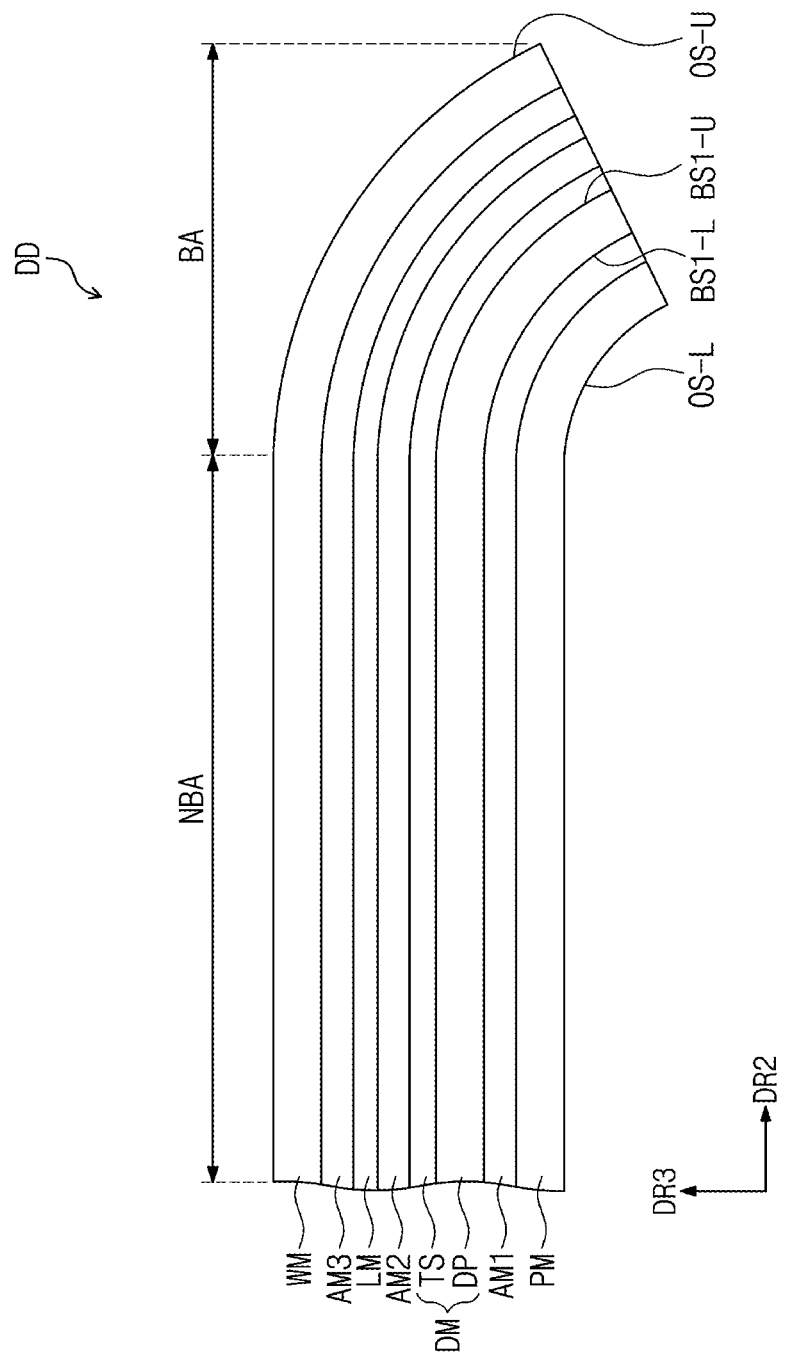
FIG. 2 is a cross-sectional view showing a display device shown in FIG. 1.

FIG. 2 is a cross-sectional view showing the display device DD shown in FIG. 1.

Referring to FIG. 2, the display device DD includes a protective film PM, a display module DM, an optical member LM, a window WM, a first adhesive member AM1, a second adhesive member AM2, and a third adhesive member AM3. Each of the protective film PM, the display module DM, the optical member LM, the window WM, the first adhesive member AM1, the second adhesive member AM2, and the third adhesive member AM3 includes the flat area NBA and the bending area BA.

The display module DM is disposed between the protective film PM and the optical member LM. The optical member LM is disposed between the display module DM and the window WM. The first adhesive member AM1 couples the display module DM and the protective film PM, the second adhesive member AM2 couples the display module DM and the optical member LM, and the third adhesive member AM3 couples the optical member LM and the window WM.

The protective film PM protects the display module DM. The protective film PM includes a first outer surface OS-L exposed to the outside and an adhesive surface adhered to the first adhesive member AM1. The protective film PM prevents external moisture from entering the display module DM and absorbs external impacts.

The protective film PM may include a plastic film as a base substrate. The protective film PM may include the plastic film including one selected from the groups consisting of polyethersulfone (PES), polyacrylate, polyetherimide (PEI), polyethylenenaphthalate (PEN), polyethyleneterephthalate (PET), polyphenylene sulfide (PPS), polyarylate, polyimide (PI), polycarbonate (PC), poly(arylene ethersulfone), and a mixture thereof.

The material of the protective film PM may include a mixed material of an organic material and an inorganic material without being limited to the plastic resins. The protective film PM includes a porous organic layer and an inorganic material filled in pores of the organic layer. The protective film PM may further include a functional layer formed in the plastic film. The functional layer includes a resin layer. The functional layer is formed by a coating method. In the present exemplary embodiment, the protective film PM may be omitted.

The window WM protects the display module DM from the external impacts and provides an input surface to the user. The window WM provides a second outer surface OS-U exposed to the outside and an adhesive surface adhered to the third adhesive member AM3. The display surface IS shown in FIGS. 1A and 1B may be the second outer surface OS-U.

The window WM may include a plastic film. The window WM may have a multi-layer structure. The window WM may have the multi-layer structure of a glass substrate, a plastic film, or a plastic substrate. The window WM may further include a bezel pattern. The multi-layer structure of the window WM may be formed through consecutive processes or an adhesive process using an adhesive.

The optical member LM reduces a reflectance of an external light. The optical member LM includes at least a polarizing film. The optical member LM further includes a retardation film. In the present exemplary embodiment, the optical member LM may be omitted.

The display module DM includes a display panel DP and an input sensing unit TS. The input sensing unit TS is directly disposed on the display panel DP. In the following descriptions, the expression "a first component is directly disposed on a second component" means that the first and second components are formed through consecutive processes without being attached to each other by using a separate adhesive layer.

The organic light emitting display panel DP generates the image WI (refer to FIG. 1A) corresponding to image data input thereto. The organic light emitting display panel DP includes a first display panel surface BS1-L and a second display panel surface BS1-U facing the first display panel surface BS1-L in the thickness direction DR3. In the present exemplary embodiment, the organic light emitting display panel DP will be described as a representative example, but the display panel DP should not be limited thereto or thereby.

The input sensing unit TS obtains coordinate information of an external input. The input sensing unit TS senses the external input in an electrostatic capacitive manner.

Although not shown in the figures, the display module DM according to the present exemplary embodiment may further include an anti-reflection layer. The anti-reflection layer may include a stack structure of a color filter or a conductive layer/an insulating layer/a conductive layer. The anti-reflection layer absorbs or polarizes the light from the outside thereof to reduce the reflectance of the external light. The anti-reflection layer may replace the function of the optical member LM.

Each of the first, second, and third adhesive members AM1, AM2, and AM3 may be, but not limited to, an organic adhesive layer, such as an optically clear adhesive film (OCA), an optically clear resin (OCR), or a pressure sensitive adhesive film (PSA). The organic adhesive layer may include a polyurethane-based adhesive material, a polyacryl-based adhesive material, a polyester-based adhesive material, a poly epoxy-based adhesive material, or a polyvinyl acetate-based adhesive material.

Although not shown in the figures, the display device DD may further include a frame structure supporting the functional layers to maintain the state shown in FIGS. 1A and 1B. The frame structure may have a joint structure or a hinge structure.

Figure 3A:
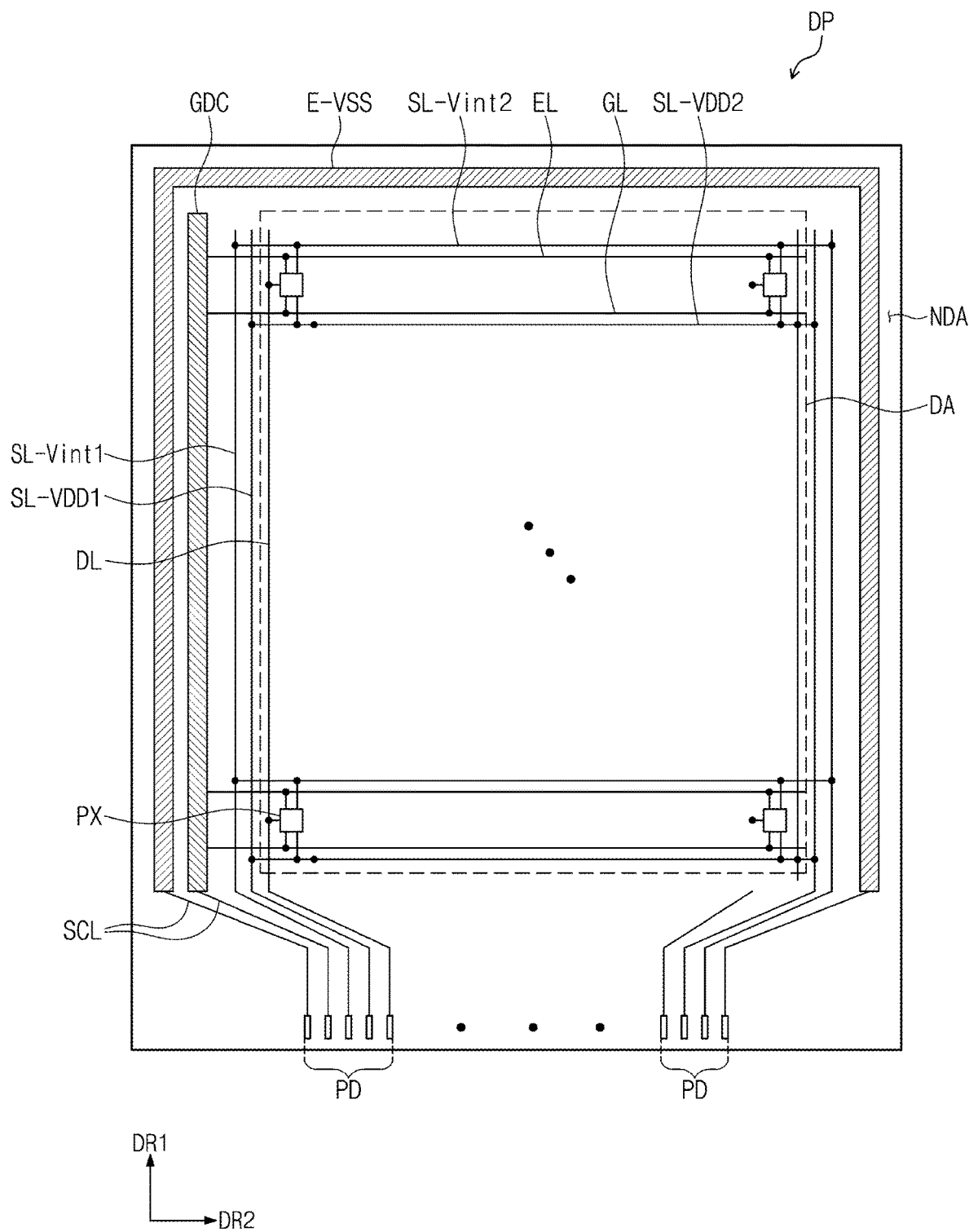
FIG. 3A is a plan view showing a display panel according to an exemplary embodiment of the invention.
Figure 3B:
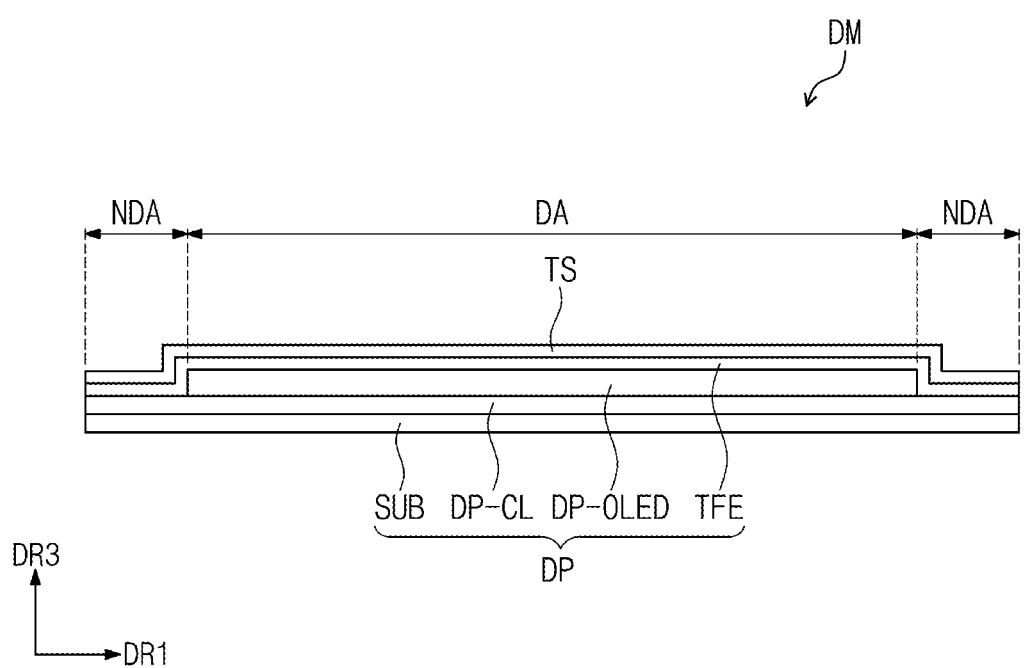
FIG. 3B is a cross-sectional view showing a display module according to an exemplary embodiment of the invention.

FIG. 3A is a plan view showing a display panel according to an exemplary embodiment of the present disclosure. FIG. 3B is a cross-sectional view showing a display module according to an exemplary embodiment of the present disclosure.

Referring to FIG. 3A, the organic light emitting display panel DP includes a display area DA and a peripheral area NDA when viewed in a plan view. The display area DA and the peripheral area NDA of the organic light emitting display panel DP respectively correspond to the display area DD-DA and the peripheral area DD-NDA of the display device DD. The display area DA and the peripheral area NDA of the organic light emitting display panel DP are not required to be identical to the display area DD-DA and the peripheral area DD-NDA of the display device DD, and the display area DA and the peripheral area NDA of the organic light emitting display panel DP may be changed in accordance with the structure and design of the organic light emitting display panel DP.

The organic light emitting display panel DP includes a plurality of gate lines GL, a plurality of data lines DL, a plurality of light emitting lines EL, a plurality of first and second initialization lines SL-Vint1 and SL-Vint2, a plurality of first power lines SL-VDD1 and SL-VDD2, a second power supply line E-VSS, a plurality of pad parts PD, a plurality of signal connection lines SCL, a gate-light emission driving part GDC, and a plurality of pixels PX.

An area in which the pixels PX are arranged is referred to as the display area DA. In the present exemplary embodiment, the peripheral area NDA is defined along an edge of the display area DA.

Each of the gate lines GL extends in the second direction DR2 and is connected to a corresponding pixel of the pixels PX, and each of the data lines DL extends in the first direction DR1 and is connected to a corresponding pixel of the pixels PX. Each of the light emitting lines EL extends in the second direction DR2 and is connected to a corresponding pixel of the pixels PX.

The first power lines SL-VDD1 and SL-VDD2 include a plurality of first sub-power lines SL-VDD1 extending in the first direction DR1 and a plurality of second sub-power lines SL-VDD2 extending in the second direction DR2 and connected to the first sub-power lines SL-VDD1. The second sub-power lines SL-VDD2 are connected to the pixels PX, and the first and second sub-power lines SL-VDD1 and SL-VDD2 receive a first voltage. The first voltage may be referred to as an "anode voltage".

The first initialization lines SL-Vint1 extend in the first direction DR1, and the second initialization lines SL-Vint2 extend in the second direction DR2 and are connected to the first initialization lines SL-Vint1. The second initialization lines SL-Vint2 are connected to the pixels and receive an initialization voltage.

The gate-light emission driving part GDC is disposed at one side of the peripheral area NDA and connected to the gate lines GL and the light emitting lines EL. The gate-light emitting driving part GDC receives a control signal through a corresponding first signal connection line among the signal connection lines SCL and generates gate signals and light emitting signals in response to the received control signal. One end of the first signal connection line is connected to the gate-light emission driving part GDC, and the other end of the first signal connection line is connected to the pad parts PD. The gate lines GL receive the gate signals, and the light emitting lines EL receive the light emitting signals. An additional gate-light emission driving part may be further disposed to face the gate-light emission driving part GDC shown in FIG. 3A in the second direction DR2.

The second power line E-VSS receives a second voltage, and the second voltage may be referred to as a "cathode voltage (or ground voltage)". Although not shown in figures, the second voltage may be applied to the pixels PX through the second power line E-VSS. The second power line E-VSS receives a control signal through a corresponding second signal connection line of the signal connection lines SCL. One end of the second signal connection line is connected to the second power line E-VSS, and the other end of the second signal connection line is connected to the pad parts PD.

Referring to FIG. 3B, the organic light emitting display panel DP includes a base substrate SUB, a circuit layer DP-CL disposed on the base substrate SUB, a light emitting device layer DP-OLED, and a thin film encapsulation layer TFE. The base substrate SUB includes at least one plastic film. The base substrate SUB may be a flexible substrate and may include a plastic substrate, a glass substrate, a metal substrate, or an organic/inorganic-mixed material substrate.

The circuit layer DP-CL includes a plurality of insulating layers, a plurality of conductive layers, and a semiconductor layer. The conductive layers of the circuit layer DP-CL may form signal lines or a control circuit of the pixel. The light emitting device layer DP-OLED includes organic light emitting diodes. The thin film encapsulation layer TFE encapsulates the light emitting device layer DP-OLED. The thin film encapsulation layer TFE includes an inorganic layer and an organic layer. The thin film encapsulation layer TFE includes at least two inorganic layers and an organic layer disposed between them. The inorganic layers protect the light emitting device layer DP-OLED from moisture and oxygen, and the organic layer protects the light emitting device layer DP-OLED from foreign substances, such as dust. The inorganic layer may include a silicon nitride layer, a silicon oxynitride layer, a silicon oxide layer, a titanium oxide layer, or an aluminum oxide layer. The organic layer may include an acryl-based organic material, but it should not be limited thereto.

The input sensing unit TS is directly disposed on the thin film encapsulation layer TFE, but it should not be limited thereto. The input sensing unit TS includes touch sensors and touch signal lines. The sensors and the touch signal lines may have either a single-layer structure or a multi-layer structure.

The touch sensors and the touch signal lines may include indium tin oxide (ITO), indium zinc oxide (IZO), zinc oxide (ZnO), indium tin zinc oxide (ITZO), PEDOT, a metal nano-wire, and a graphene. The touch sensors and the touch signal lines may include a metal layer, e.g., molybdenum, silver, titanium, copper, aluminum, or an alloy thereof. The touch sensors and the touch signal lines may have the same layer structure or different layer structures. The touch sensor layer TS will be described in detail later.

Figure 4A:
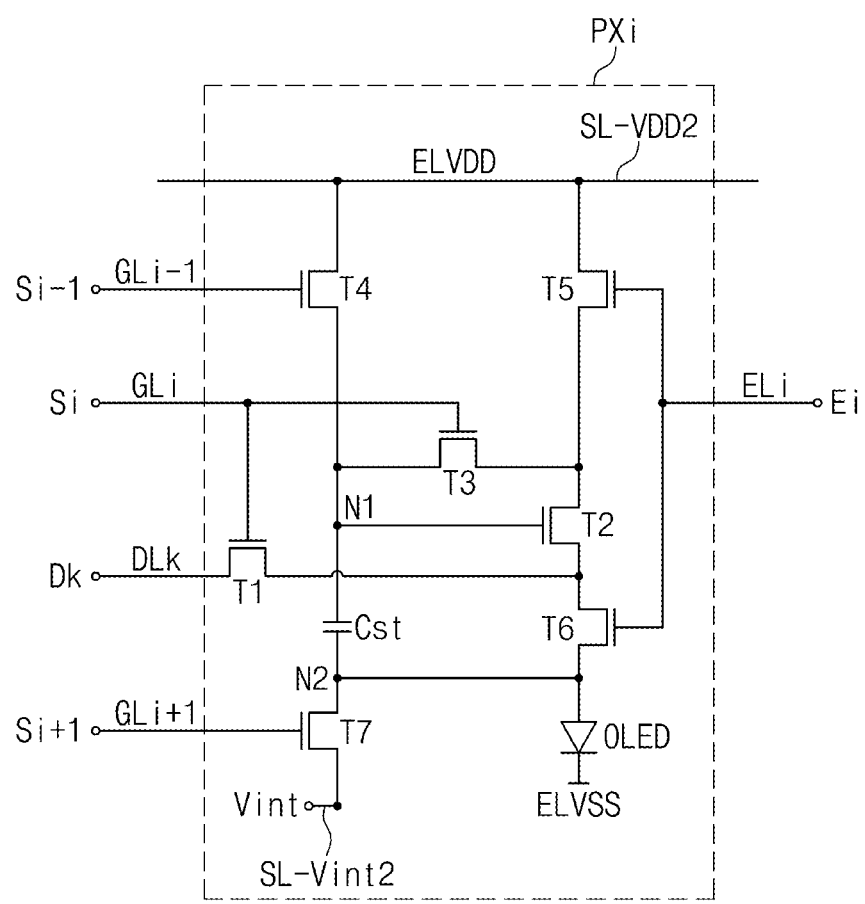
FIG. 4A is an equivalent circuit diagram showing a pixel according to an exemplary embodiment of the invention.
Figure 4B:
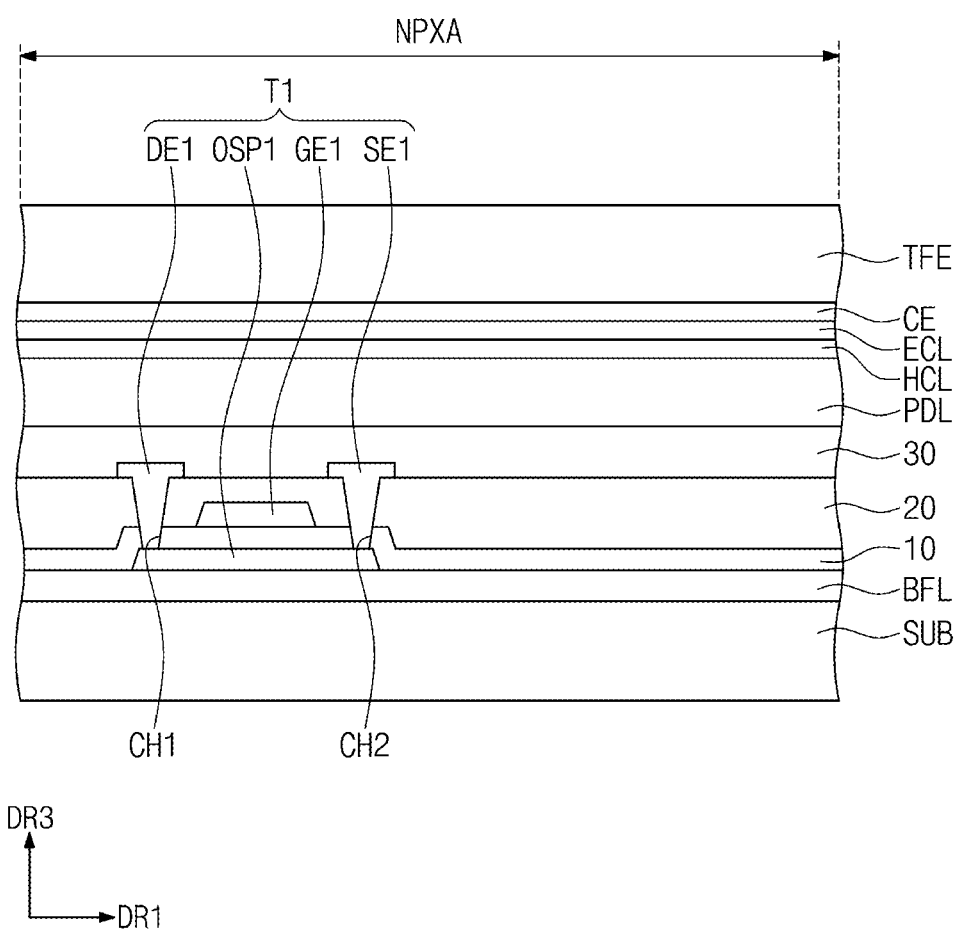
FIG. 4B and FIG. 4C are partial cross-sectional views showing a display panel according to an exemplary embodiment of the invention.
Figure 4C:
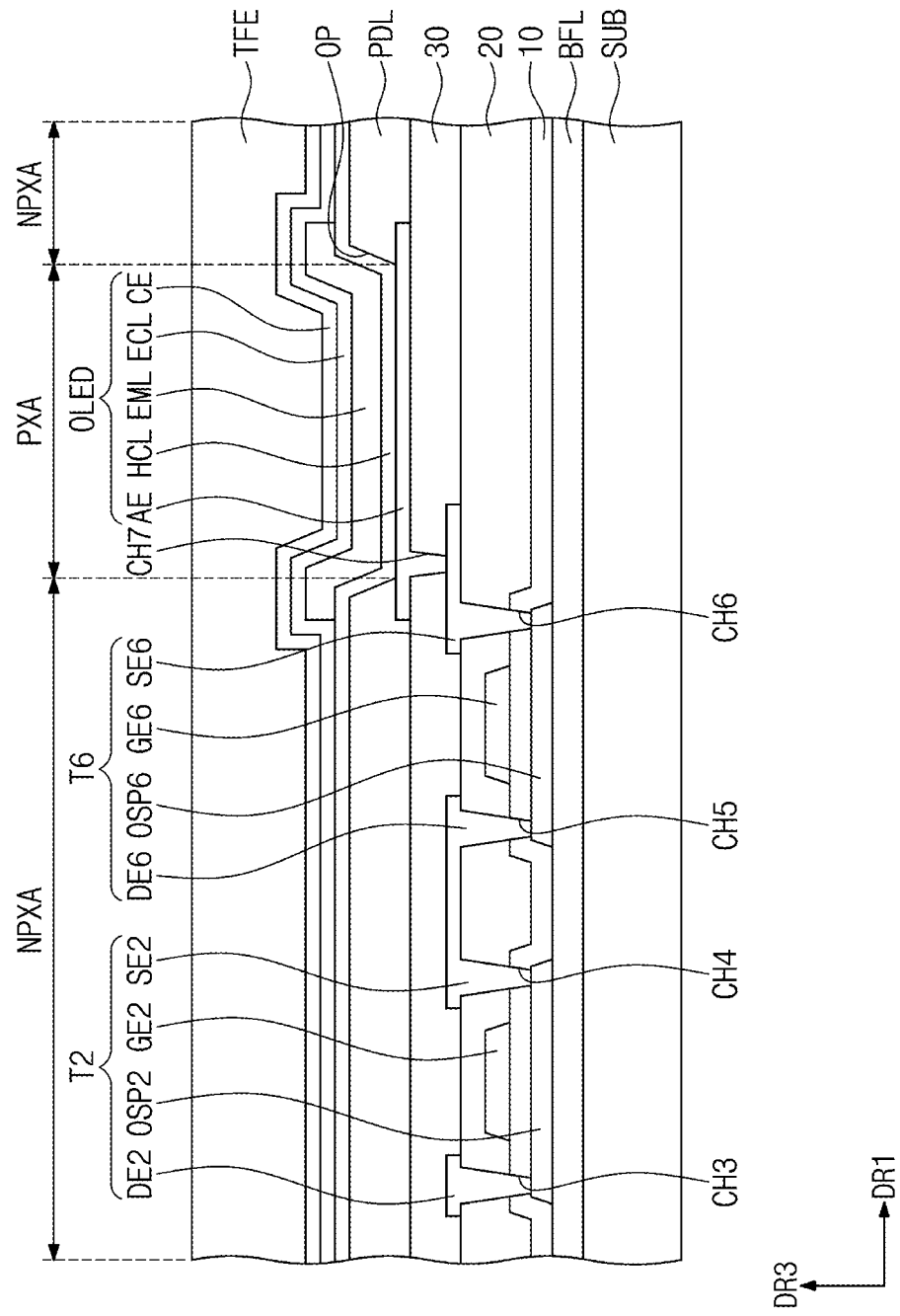

FIG. 4A is an equivalent circuit diagram showing a pixel according to an exemplary embodiment of the present disclosure. FIGS. 4B and 4C are partially cross-sectional views showing a display panel according to an exemplary embodiment of the present disclosure.

FIG. 4A shows an i-th pixel PXi connected to a k-th data line DLk among the data lines DL. FIG. 4B shows a cross-section of the portion corresponding to a first transistor T1 of the equivalent circuit shown in FIG. 4A, and FIG. 4C shows a cross-section of a portion corresponding to a second transistor T2, a sixth transistor T6, and an organic light emitting diode OLED of the equivalent circuit shown in FIG. 4A.

Referring to FIG. 4A, the i-th pixel PXi includes an organic light emitting diode OLED and a pixel driving circuit controlling the organic light emitting diode OLED. The driving circuit includes seven thin film transistors T1 to T7 and one storage capacitor Cst. In the present exemplary embodiment, the pixel driving circuit includes seven transistors T1 to T7 and one storage capacitor Cst, but the pixel PXi may be sufficient to include the first transistor (or a "driving transistor") T1, the second transistor (or a "switching transistor") T2, and the capacitor Cst as the driving circuit to drive the organic light emitting diode OLED, and the pixel driving circuit may have various configurations.

The driving transistor controls a driving current applied to the organic light emitting diode OLED. An output electrode of the second transistor T2 is electrically connected to the organic light emitting diode OLED. The output electrode of the second transistor T2 directly makes contact with an anode of the organic light emitting diode OLED or is connected to the anode of the organic light emitting diode OLED via another transistor, e.g., the sixth transistor T6.

A control electrode of a control transistor receives a control signal. The control signal applied to the i-th pixel PXi includes an (i−1)th gate signal Si−1, an i-th gate signal Si, an (i+1)th gate signal Si+1, a data signal Dk, and an i-th light emitting control signal Ei. In the present exemplary embodiment, the control transistor includes the first transistor T1 and third to seventh transistors T3 to T7.

The first transistor T1 includes an input electrode connected to the k-th data line DLk, a control electrode connected to an i-th gate line GLi, and an output electrode connected to the output electrode of the second transistor T2. The first transistor T1 is turned on by the gate signal Si (hereinafter, referred to as the "i-th gate signal") applied to the i-th gate line GLi to provide the data signal Dk applied to the k-th data line to the storage capacitor Cst.

Referring to FIGS. 4B and 4C, the first transistor T1, the second transistor T2, and the sixth transistor T6 are disposed on the base substrate SUB. The first, second, and sixth transistors T1, T2, and T6 have the same structure as each other, and thus the first transistor T1 will be described in detail, and details of the second and sixth transistors T2 and T6 will be omitted.

An upper surface of the base substrate SUB is defined by the first direction DR1 and the second direction DR2. The first transistor T1 includes a first input electrode DE1, a first output electrode SE1, a first control electrode GE1, and a first oxide semiconductor pattern OSP1.

A buffer layer BFL is disposed on the base substrate SUB. The buffer layer BFL improves a coupling force between the base substrate SUB and the conductive patterns or the semiconductor patterns. The buffer layer BFL includes an inorganic layer. Although not shown in the figures, a barrier layer may be further disposed on the base substrate SUB to prevent foreign substances from entering. The buffer layer BFL and the barrier layer may be selectively disposed or omitted.

The base substrate SUB may include a plastic substrate, a glass substrate, or a metal substrate. The plastic substrate includes at least one of an acryl-based resin, a methacryl-based resin, polyisoprene, a vinyl-based resin, an epoxy-based resin, a urethane-based resin, a cellulose-based resin, a siloxane-based resin, a polyimide-based resin, a poly-amide-based resin, and a perylene-based resin.

The first oxide semiconductor pattern OSP1 is disposed on the buffer layer BFL. The first oxide semiconductor pattern OSP1 may include indium tin oxide (ITO), indium gallium zinc oxide (IGZO), zinc oxide (ZnO), or indium zinc oxide (IZO).

A first insulating layer 10 is disposed on the buffer layer BFL to cover the first oxide semiconductor pattern OSP1.

The first control electrode GE1 is disposed on the first insulating layer 10, and a second insulating layer 20 is disposed on the first insulating layer 10 to cover the first control electrode GE1. The second insulating layer 20 provides a flat upper surface. The second insulating layer 20 includes an organic material and/or an inorganic material.

The first insulating layer 10 and the second insulating layer 20 include an inorganic material. The inorganic material includes at least one of aluminum oxide, titanium oxide, silicon oxide, silicon oxynitride, zirconium oxide, and hafnium oxide A first contact hole CH1 and a second contact hole CH2 are respectively defined through the first and second insulating layers 10 and 20 to respectively expose a first area and a second area of the first oxide semiconductor pattern OSP1. Each of the first and second contact holes CH1 and CH2 penetrates through the first and second insulating layers 10 and 20.

The first input electrode DE1 and the first output electrode SE1 are disposed on the second insulating layer 20. The first input electrode DE1 and the first output electrode SE1 are respectively connected to the first area and the second area of the first oxide semiconductor pattern OSP1 through the first contact hole CH1 and the second contact hole CH2.

A third insulating layer 30 is disposed on the second insulating layer 20 to cover the first input electrode DE1 and the first output electrode SE1. The third insulating layer 30 provides a flat upper surface. The third insulating layer 30 includes an organic material and/or an inorganic material. That is, the third insulating layer 30 covers input electrodes and output electrodes.

FIG. 4C shows the sixth transistor T6 having substantially the same structure as the second transistor T2. However, the structure of the sixth transistor T6 may be changed. The sixth transistor T6 includes an input electrode DE6 connected to the output electrode SE2 of the second transistor T2 on the third insulating layer 30.

The organic light emitting diode OLED and a pixel definition layer PDL are disposed on the third insulating layer 30. The anode AE is disposed on the third insulating layer 30. The anode AE is connected to an sixth output electrode SE6 of the sixth transistor T6 through a seventh contact hole CH7 defined through the third insulating layer 30. The pixel definition layer PDL is provided with an opening OP defined therethrough. At least a portion of the anode AE is exposed through the opening OP of the pixel definition layer PDL.

The pixel PX is disposed in a pixel area of the organic light emitting display panel DP when viewed in a plan view. The pixel area includes a light emitting area PXA and a non-light emitting area NPXA adjacent to the light emitting area PXA. The non-light emitting area NPXA is disposed to surround the light emitting area PXA. In the present exemplary embodiment, the light emitting area PXA is defined to correspond to the anode AE, but it should not be limited thereto. The light emitting area PXA may be defined as an area in which a light is generated. The light emitting area PXA may be defined to correspond to a portion of the anode AE exposed through the opening OP.

A hole control layer HCL is commonly disposed in the light emitting area PXA and the non-light emitting area NPXA. Although not shown in figures, a common layer, such as the hole control layer HCL, may be commonly formed in the pixels PX.

An organic light emitting layer EML is disposed on the hole control layer HCL. The organic light emitting layer EML is disposed only in an area corresponding to the opening OP. That is, the organic light emitting layer EML may be patterned into plural parts, and the parts may be respectively disposed in the pixels PX.

An electron control layer ECL is disposed on the organic light emitting layer EML. A cathode CE is disposed on the electron control layer ECL. The cathode CE is commonly disposed in the pixels PX.

The thin film encapsulation layer TFE is disposed on the cathode CE. The thin film encapsulation layer TFE is commonly disposed in the pixels PX. The thin film encapsulation layer TFE includes at least one inorganic layer and at least one organic layer. The thin film encapsulation layer TFE may include a plurality of inorganic layers and a plurality of organic layers alternately stacked with the inorganic layers.

In the present exemplary embodiment, the patterned organic light emitting layer EML is shown as a representative example, but the organic light emitting layer EML may be commonly disposed in the pixels PX. In this case, the organic light emitting layer EML may generate white light. In addition, the organic light emitting layer EML may have a multi-layer structure.

In the present exemplary embodiment, the thin film encapsulation layer TFE directly covers the cathode CE. In the present exemplary embodiment, a capping layer may further be disposed to cover the cathode CE. In this case, the thin film encapsulation layer TFE directly covers the capping layer.

Figure 5A:
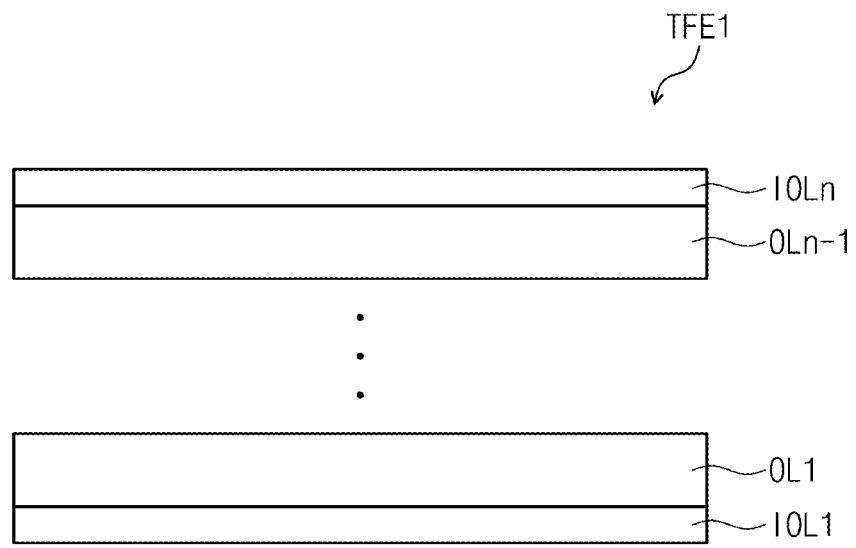
FIG. 5A, FIG. 5B, and FIG. 5C are cross-sectional views showing a thin film encapsulation layer according to an exemplary embodiment of the invention.
Figure 5B:
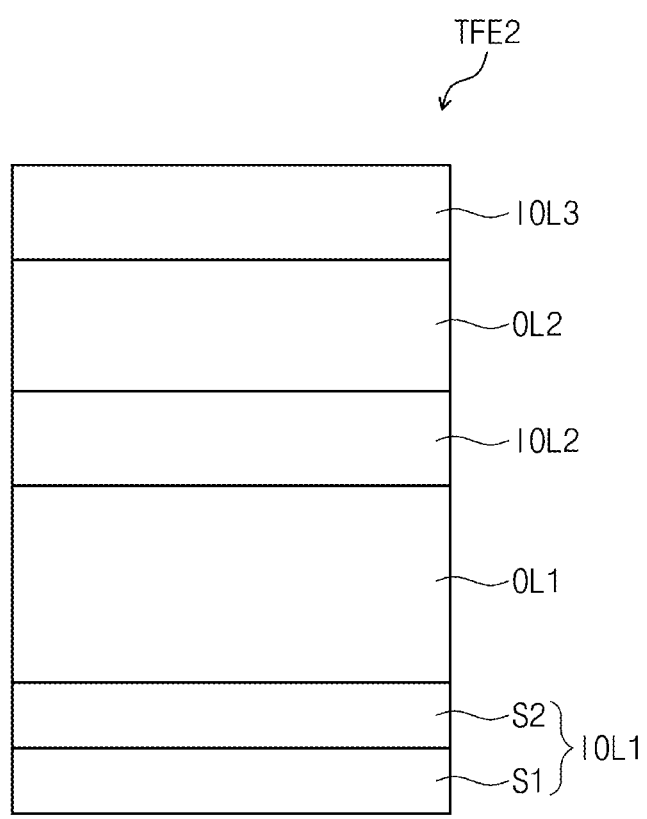
Figure 5C:
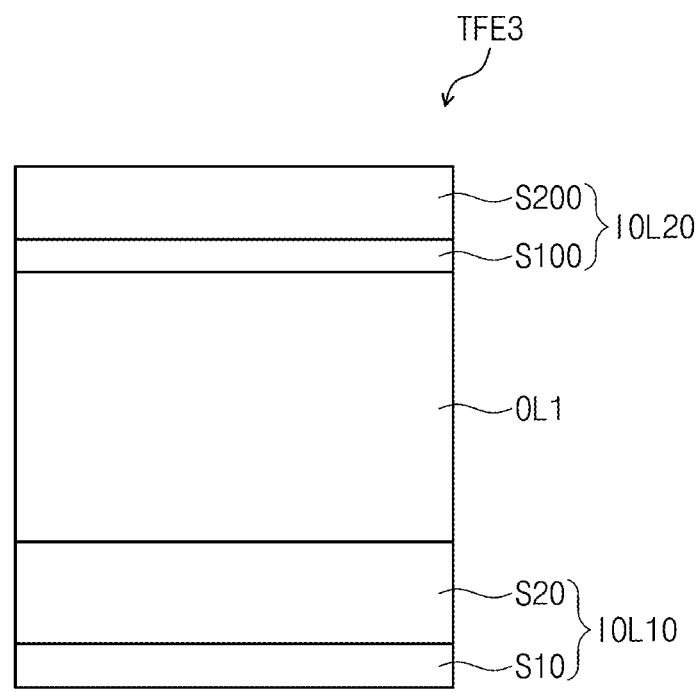

FIGS. 5A to 5C are cross-sectional views showing a thin film encapsulation layer according to an exemplary embodiment of the present disclosure.

Hereinafter, thin film encapsulation layers TFE1, TFE2, and TFE3 will be described in detail with reference to FIG. 5A to FIG. 5C.

Referring to FIG. 5A, the thin film encapsulation layer TFE1 includes n inorganic thin layers IOL1 to IOLn. The thin film encapsulation layer TFE1 includes n−1 organic thin layers OL1 to OLn−1, and the n−1 organic thin layers OL1 to OLn−1 are alternately arranged with the n inorganic thin layers IOL1 to IOLn. The n−1 organic thin layers OL1 to OLn−1 may have a thickness greater than that of the n inorganic thin layers IOL1 to IOLn.

Each of the n inorganic thin layers IOL1 to IOLn may have either a single-layer structure containing one type of material or a multi-layer structure containing a plurality different types of material. Each of the n−1 organic thin layers OL1 to OLn−1 may be formed by depositing, printing, or coating organic monomers. The organic monomers may include an acryl-based monomer.

Referring to FIG. 5B and FIG. 5C, the inorganic thin layers included in each of the thin film encapsulation layers TFE2 and TFE3 may include the same inorganic material or different inorganic materials from each other, and may have the same thickness or different thicknesses. The organic thin layers included in each of the thin film encapsulation layers TFE2 and TFE3 may include the same organic material or different organic materials from each other and may have the same thickness or different thicknesses.

As shown in FIG. 5B, the thin film encapsulation layer TFE2 includes the first inorganic thin layer IOL1, the first organic thin layer OL1, the second inorganic thin layer IOL2, the second organic thin layer OL2, and the third inorganic thin layer IOL3, which are sequentially stacked.

The first inorganic thin layer IOL1 may have a double-layer structure that may include, for example, a first sub-layer S1 and a second sub-layer S2 that include different inorganic materials.

As shown in FIG. 5C, the thin film encapsulation layer TFE3 includes a first inorganic thin layer IOL10, a first organic thin layer OL1, and a second inorganic thin layer IOL20, which are sequentially stacked. The first inorganic thin layer IOL10 may have a double-layer structure including, for example, a first sub-layer S10 and a second sub-layer S20 that may include different inorganic materials. The second inorganic thin layer IOL20 may have a double-layer structure. The second inorganic thin layer IOL20 may include a first sub-layer S100 and a second sub-layer S200, which are deposited in different environments. The first sub-layer S100 may be deposited at a relatively low power level, and the second sub-layer S200 may be deposited at a relatively high power level. The first and second sub-layers S100 and S200 may include the same inorganic material.

Figure 6A:
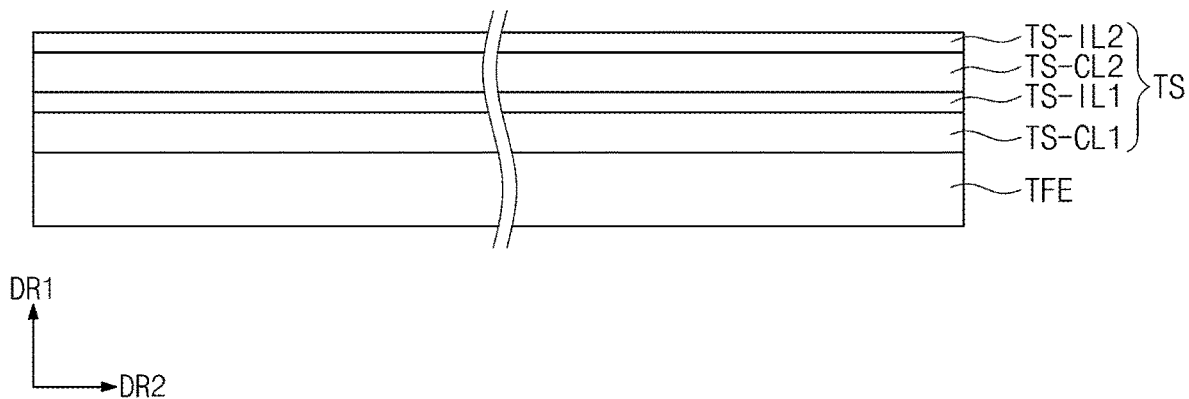
FIG. 6A is a cross-sectional view showing an input sensing unit according to an exemplary embodiment of the invention.

FIG. 6A is a cross-sectional view showing an input sensing unit according to an exemplary embodiment of the present disclosure. FIG. 6B to FIG. 6E are plan views showing an input sensing unit according to an exemplary embodiment of the present disclosure.

Referring to FIG. 6A, the input sensing unit TS includes a first conductive layer TS-CL1, a first insulating layer (hereinafter, referred to as a "first touch insulating layer) TS-IL1, a second conductive layer TS-CL2, and a second insulating layer (hereinafter, referred to as a "second touch insulating layer) TS-IL2. The first conductive layer TS-CL1 is directly disposed on the thin film encapsulation layer TFE, but the inventive concept should not be limited thereto. That is, another inorganic layer (e.g., a buffer layer) may be further disposed between the first conductive layer TS-CL1 and the thin film encapsulation layer TFE.

Each of the first conductive layer TS-CL1 and the second conductive layer TS-CL2 has a single-layer structure or a multi-layer structure having a plurality of layers stacked in the third direction DR3. The conductive layer having the multi-layer structure may include two or more layers among transparent conductive layers and metal layers. The conductive layer having the multi-layer structure may include metal layers including different metals from each other. The transparent conductive layer may include indium tin oxide (ITO), indium zinc oxide (IZO), zinc oxide (ZnO), indium tin zinc oxide (ITZO), PEDOT, a metal nano-wire, or a graphene. The metal layer may include molybdenum, silver, titanium, copper, aluminum, or an alloy thereof.

Each of the first conductive layer TS-CL1 and the second conductive layer TS-CL2 includes a plurality of patterns. Hereinafter, the first conductive layer TS-CL1 includes first conductive patterns, and the second conductive layer TS-CL2 includes second conductive patterns. Each of the first and second conductive patterns includes touch electrodes and touch signal lines.

Each of the first touch insulating layer TS-IL1 and the second conductive layer TS-CL2 includes an inorganic material or an organic material. The inorganic material may include at least one of aluminum oxide, titanium oxide, silicon oxide, silicon nitride, silicon oxynitride, zirconium oxide, and hafnium oxide. The organic material may include at least one of an acryl-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Each of the first touch insulating layer TS-IL1 and the second touch insulating layer TS-IL2 has a single-layer structure or a multi-layer structure. Each of the first touch insulating layer TS-IL1 and the second touch insulating layer TS-IL2 may include at least one of an inorganic layer and an organic layer. The inorganic layer and the organic layer may be formed by a chemical vapor deposition method.

The first touch insulating layer TS-IL1 should not be limited to a specific shape if the first touch insulating layer TS-IL1 insulates the first conductive layer TS-CL1 and the second conductive layer TS-CL2. The shape of the first touch insulating layer TS-IL1 is determined according to a shape of the first and second conductive patterns. The first touch insulating layer TS-IL1 entirely covers the thin film encapsulation layer TFE or includes a plurality of insulating patterns. The insulating patterns are overlapped with first connection parts CP1 and second connection parts CP2, to be described later.

In the present exemplary embodiment, the two-layer type touch sensor layer has been described, but the touch sensor layer should not be limited to the two-layer type. A single-layer type touch sensor layer may include a conductive layer and an insulating layer covering the conductive layer. The conductive layer may include touch sensors and touch signal lines connected to the touch sensors. The single-layer type touch sensor layer obtains coordinate information using a self-capacitance method.

FIG. 6B to FIG. 6E are plan views showing an input sensing unit TS according to an exemplary embodiment of the present disclosure.

Figure 6B:
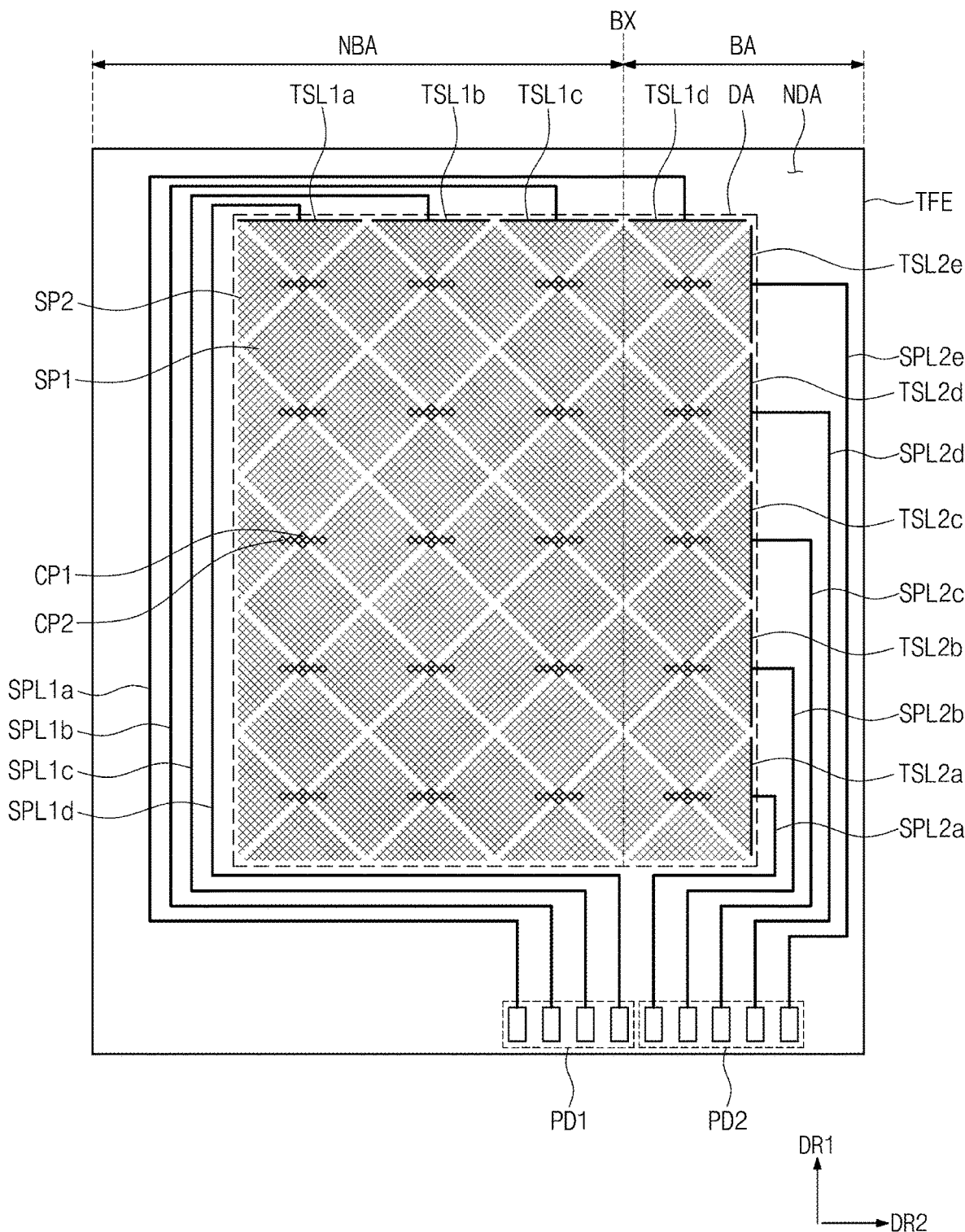
FIG. 6B, FIG. 6C, FIG. 6D, and FIG. 6E are plan views showing an input sensing unit according to an exemplary embodiment of the invention.

Referring to FIG. 6B, the input sensing unit TS may include a plurality of first touch sensors, a plurality of second touch sensors, a plurality of connection electrodes, a plurality of touch signal lines, a first pad part PD1, and a second pad part PD2.

The first touch sensors and the second touch sensors are arranged in the display area DA. The touch signal lines, the first pad part PD1, and the second pad part PD2 are arranged in the peripheral area NDA. The connection electrodes are arranged in the display area DA, but the connection electrodes may be arranged in the peripheral area NDA according to exemplary embodiments.

The first touch sensors extend in the first direction DR1 and are arranged in the second direction DR2. Each of the first touch sensors may include a plurality of first sensor parts SP1 and a plurality of first connection parts CP1 connecting the first sensor parts SP1.

Each of the first sensor parts SP1 and the first connection parts CP1 have a mesh shape through which a plurality of mesh openings is defined. The first sensor parts SP1 and the first connection parts CP1 are arranged in the first direction DR1. Each of the first connection parts CP1 connects two first sensor parts SP1 adjacent to each other among the first sensor parts SP1.

According to the present exemplary embodiment, a first first touch sensor and a last first touch sensor (hereinafter, referred to as an "n-th first touch sensor") among the first touch sensors may be disposed substantially adjacent to the peripheral area NDA. Here, the "n" denotes a natural number. As shown in FIG. 6B, the first first touch sensor and the n-th first touch sensor face each other in the second direction DR2 and are disposed most adjacent to the peripheral area NDA.

In particular, the first sensor parts included in the first first touch sensor and the n-th first touch sensor may have a shape different from that of the first sensor parts included in a second first touch sensor to an (n−1)th first touch sensor. As an example, the first sensor parts included in the first first touch sensor and the n-th first touch sensor may have a shape corresponding to a portion of the shape of the first sensor parts included in the second first touch sensor to the (n−1)th first touch sensor.

The second touch sensors extend in the second direction DR2 and are arranged in the first direction DR1. Each of the second touch sensors includes a plurality of second sensor parts SP2 and a plurality of second connection parts CP2 connecting the second sensor parts SP2.

Each of the second sensor parts SP2 and the second connection parts CP2 have a mesh shape through which a plurality of mesh openings is defined. The second sensor parts SP2 and the second connection parts CP2 are arranged in the second direction DR2. Each of the second connection parts CP2 connects two second sensor parts SP2 adjacent to each other among the second sensor parts SP2.

According to the present exemplary embodiment, a first second touch sensor and a last second touch sensor (hereinafter, referred to as an "m-th second touch sensor") among the second touch sensors may be disposed most adjacent to the peripheral area NDA. Here, the "m" denotes a natural number. As shown in FIG. 6B, the first second touch sensor and the m-th second touch sensor face each other in the first direction DR1 and are disposed most adjacent to the peripheral area NDA.

In particular, the second sensor parts included in the first second touch sensor and the m-th second touch sensor may have a shape different from that of the second sensor parts included in a second second touch sensor to an (m−1)th second touch sensor. As an example, the second sensor parts SP2 included in the first second touch sensor and the m-th second touch sensor may have a shape corresponding to a portion of the shape of the second sensor parts SP2 included in the second second touch sensor to the (m−1)th second touch sensor.

The first sensor parts SP1 included in the first touch sensors are capacitively coupled to the second sensor parts SP2 included in the second sensor parts SP2. When the touch sensing signals are applied to the first sensor parts SP1, capacitors are formed between the first sensor parts SP1 and the second sensor parts SP2.

The connection electrodes include first connection electrodes TSL1a to TSL1d and second connection electrodes TSL2a to TSL2e.

The first connection electrodes TSL1a to TSL1d are arranged in the second direction DR2 and are respectively connected to ends of the first touch sensors. In detail, a first connection electrode TSL1a is connected to the end of a first first touch sensor of the first touch sensors. A second connection electrode TSL1b is connected to the end of a second first touch sensor of the first touch sensors. A third connection electrode TSL1c is connected to the end of a third first touch sensor of the first touch sensors. A fourth connection electrode TSL1d is connected to the end of a fourth first touch sensor of the first touch sensors. As described above, the first connection electrodes TSL1a to TSL1d are respectively connected to the ends of the first touch sensors to apply electrical signals to the first touch sensors.

The second connection electrodes TSL2a to TSL2e are arranged in the first direction DR1 and are respectively connected to ends of the second touch sensors. In detail, a first connection electrode TSL2a is connected to the end of a first second touch sensor of the second touch sensors. A second connection electrode TSL2b is connected to the end of a second second touch sensor of the second touch sensors. A third connection electrode TSL2c is connected to the end of a third second touch sensor of the second touch sensors. A fourth connection electrode TSL2d is connected to the end of a fourth second touch sensor of the second touch sensors. A fifth connection electrode TSL2e is connected to the end of a fifth second touch sensor of the second touch sensors. As described above, the second connection electrodes TSL2a to TSL2e are respectively connected to the ends of the second touch sensors to apply electrical signals to the second touch sensors.

Meanwhile, among the first connection electrodes TSL1a to TSL1d, the first to third first connection electrodes TSL1a to TSL1c are arranged in the flat area NBA, and the fourth first connection electrode TSL1d is arranged in the bending area BA. A structure in which the fourth first connection electrode TSL1d is arranged in the bending area BA will be described as a representative example, but one or more connection electrodes may be disposed in the bending area BA. According to the present exemplary embodiment, one connection electrode is disposed in the bending area BA.

Referring to FIG. 6B, each of the first connection electrodes TSL1a to TSL1d extends in the second direction DR2 substantially perpendicular to the bending axis BX. The display device DD according to the present disclosure is bent along the second direction DR2 with respect to the bending axis BX. As a result, the largest stress may be applied to both ends of the fourth first connection electrode TSL1d disposed in the bending area BA among the first connection electrodes TSL1a to TSL1d. Accordingly, a fracture may occur in the fourth first connection electrode TSL1d.

According to the present exemplary embodiment, one edge portion of opposite edge portions of the fourth first connection electrode TSL1d may be inclined with respect to the bending axis BX. When the one edge portion of the fourth first connection electrode TSL1d is inclined with respect to the bending axis BX, the stress applied to the both ends of the fourth first connection electrode TSL1d may be reduced.

Hereinafter, each of the first connection electrodes TSL1a to TSL1d and the second connection electrodes TSL2a to TSL2e may include a center portion and opposite edge portions.

As described above, at least one edge portion of opposite edge portions of the connection electrode disposed in the bending area BA among the first connection electrodes TSL1a to TSL1d may include the edge inclined with respect to the bending axis BX.

The touch signal lines include first touch signal lines SPL1a to SPL and second touch signal lines SPL2a to SPL2e. First ends of the first touch signal lines SPL1a to SPL1d are respectively connected to the first connection electrodes TSL1a to TSL1d. Second ends of the first touch signal lines SPL1a to SPL1d are respectively connected to pads included in the first pad part PD1. The first touch signal lines SPL1a to SPL1d transmit electrical signals output from the first pad part PD1 to the first connection electrodes TSL1a to TSL1d.

First ends of the second touch signal lines SPL2a to SPL2e are respectively connected to the second connection electrodes TSL2a to TSL2e. Second ends of the second touch signal lines SPL2a to SPL2e are respectively connected to pads included in the second pad part PD2. The second touch signal lines SPL2a to SPL2e transmit electrical signals output from the second pad part PD2 to the second connection electrodes TSL2a to TSL2e.

Although not shown in the figures, the first touch signal lines SPL1a to SPL and the second touch signal lines SPL2a to SPL2e may have a mesh shape.

According to the present exemplary embodiment, some of the first sensor parts SP1, the first connection parts CP1, the first touch signal lines SPL1a to SPL1d, the second sensor parts SP2, the second connection parts CP2, and the second touch signal lines SPL2a to SPL2e are formed by patterning the first conductive layer TS-CL1 shown in FIG. 6A, and the others of the first sensor parts SP1, the first connection parts CP1, the first touch signal lines SPL1a to SPL1d, the second sensor parts SP2, the second connection parts CP2, and the second touch signal lines SPL2a to SPL2e are formed by patterning the second conductive layer TS-CL2 shown in FIG. 6A.

To electrically connect conductive patterns disposed on different layers, a contact hole may be formed through the first touch insulating layer TS-IL1 shown in FIG. 6A. Hereinafter, the input sensing unit TS will be described with reference to FIG. 6C to FIG. 6E.

Figure 6C:
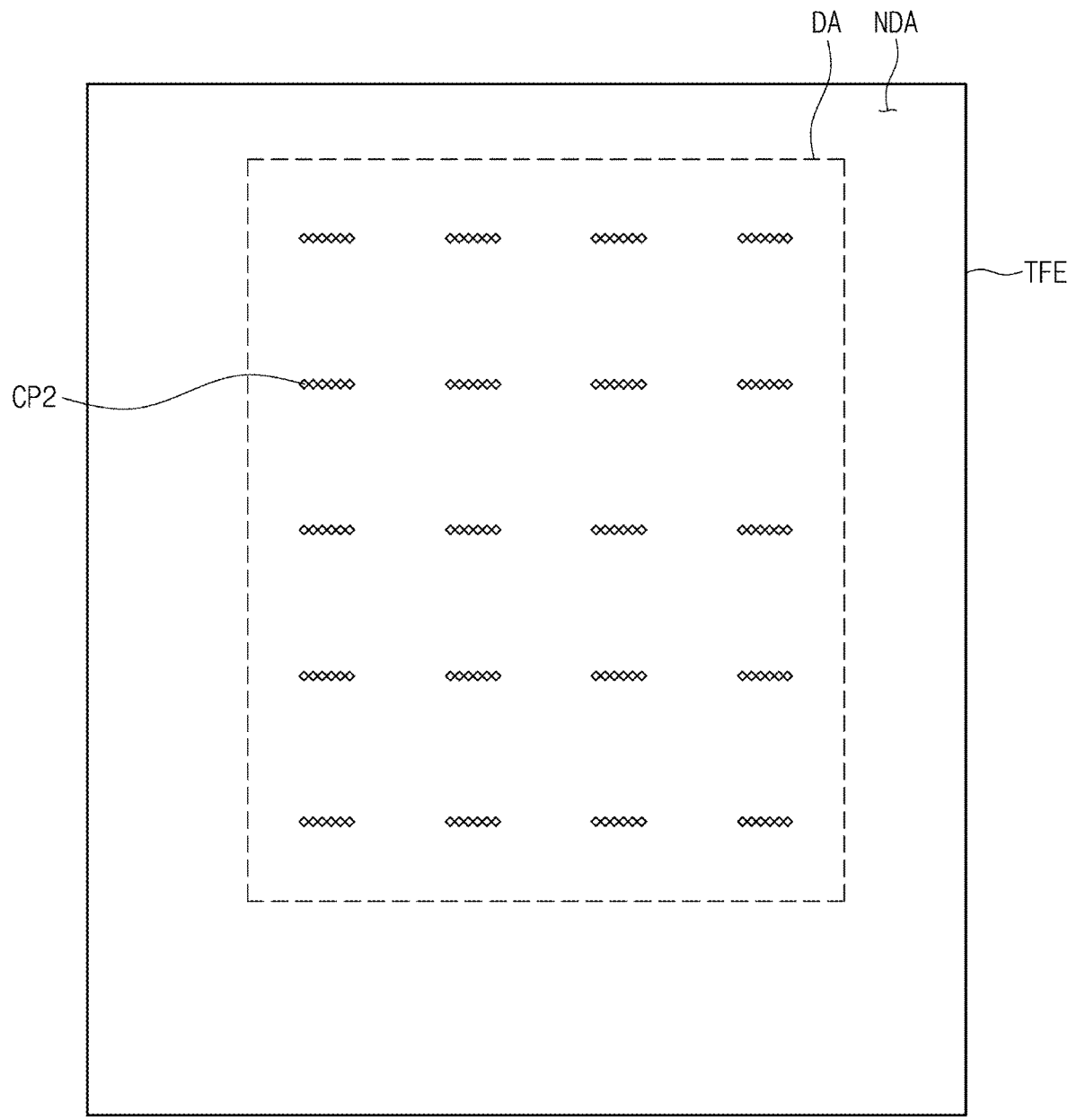

Referring to FIG. 6C, the first conductive patterns are disposed on the thin film encapsulation layer TFE. The first conductive patterns include the second connection parts CP2. The second connection parts CP2 are directly disposed on the thin film encapsulation layer TFE. The thin film encapsulation layer TFE covers the display area DA.

Figure 6D:
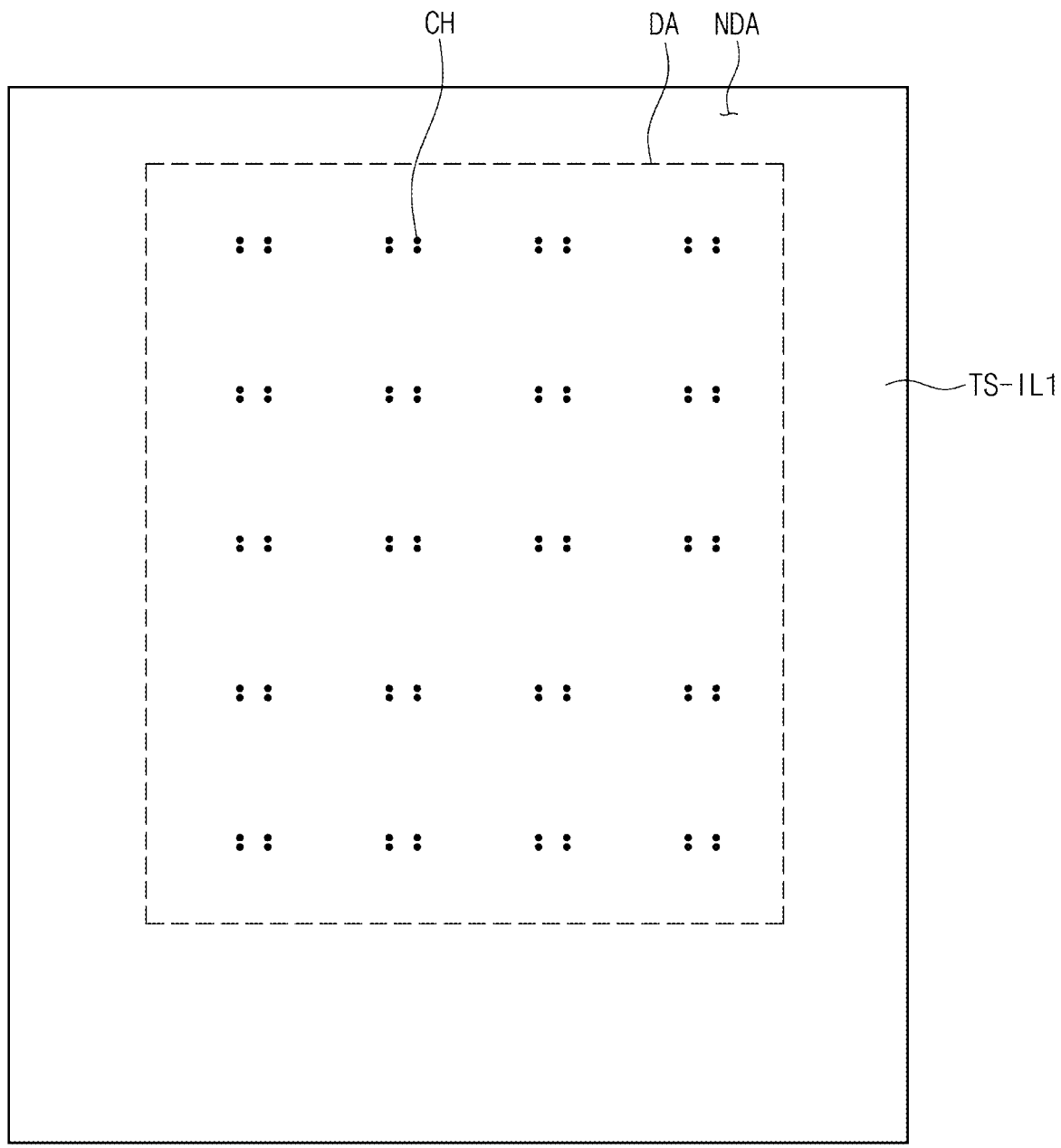

Referring to FIG. 6D, the first touch insulating layer TS-IL1 is disposed on the thin film encapsulation layer TFE to cover the second connection parts CP2. Contact holes CH are defined through the first touch insulating layer TS-IL1 to partially expose the second connection parts CP2. The contact holes CH are formed by a photolithography process.

Figure 6E:
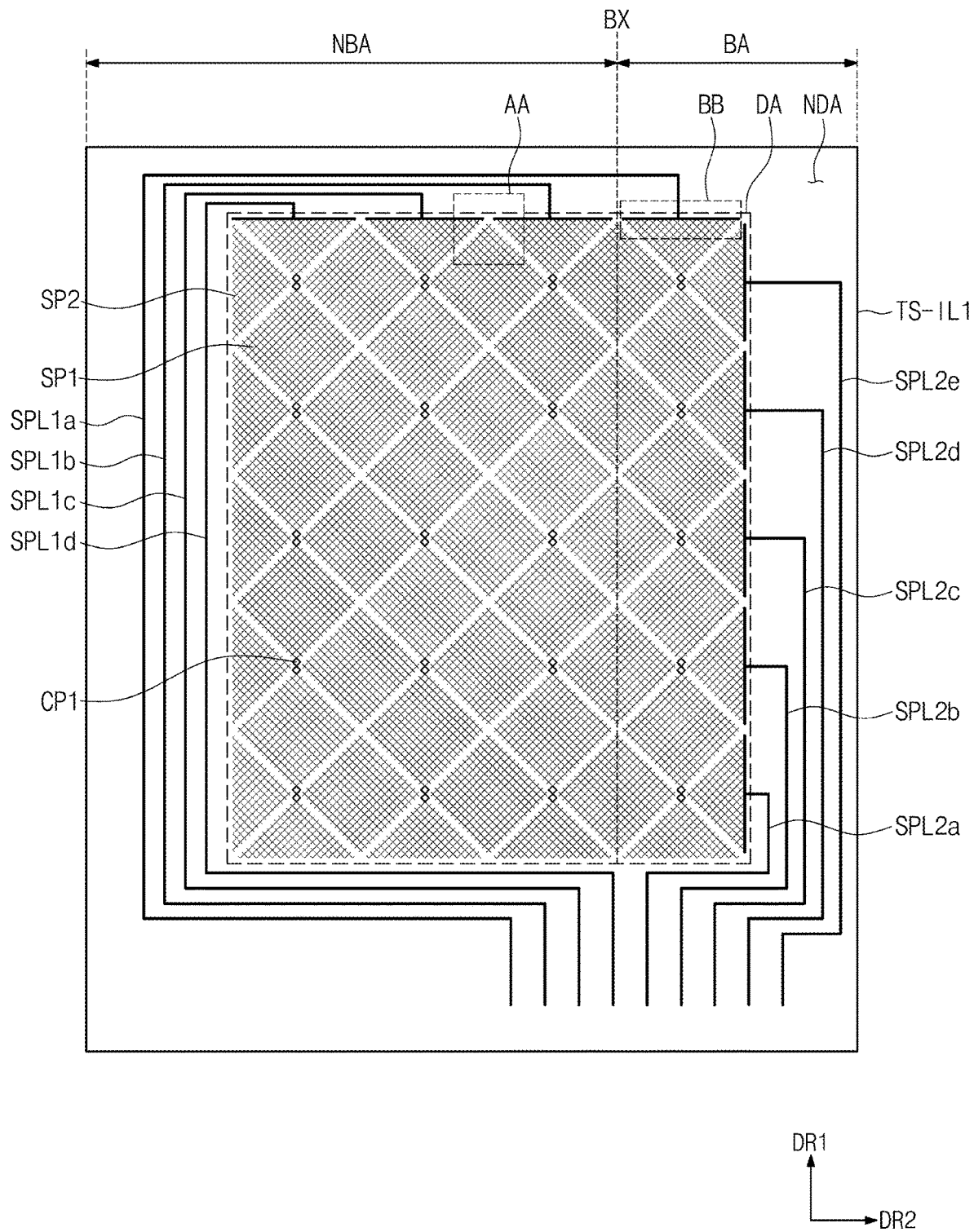

Referring to FIG. 6E, the second conductive patterns are disposed on the first touch insulating layer TS-IL1. The second conductive patterns include the first sensor parts SP1, the first connection parts CP1, the first touch signal lines SPL1a to SPL1d, the second sensor parts SP2, and the second touch signal lines SPL2a to SPL2e. Although not shown separately, the second touch insulating layer TS-IL2 is disposed on the first touch insulating layer TS-IL1 to cover the second conductive patterns.

In addition, according to another exemplary embodiment of the present disclosure, the first conductive patterns and the second conductive patterns may be changed with respect to each other. That is, the second conductive patterns may include the second connection parts CP2.

Figure 7A:
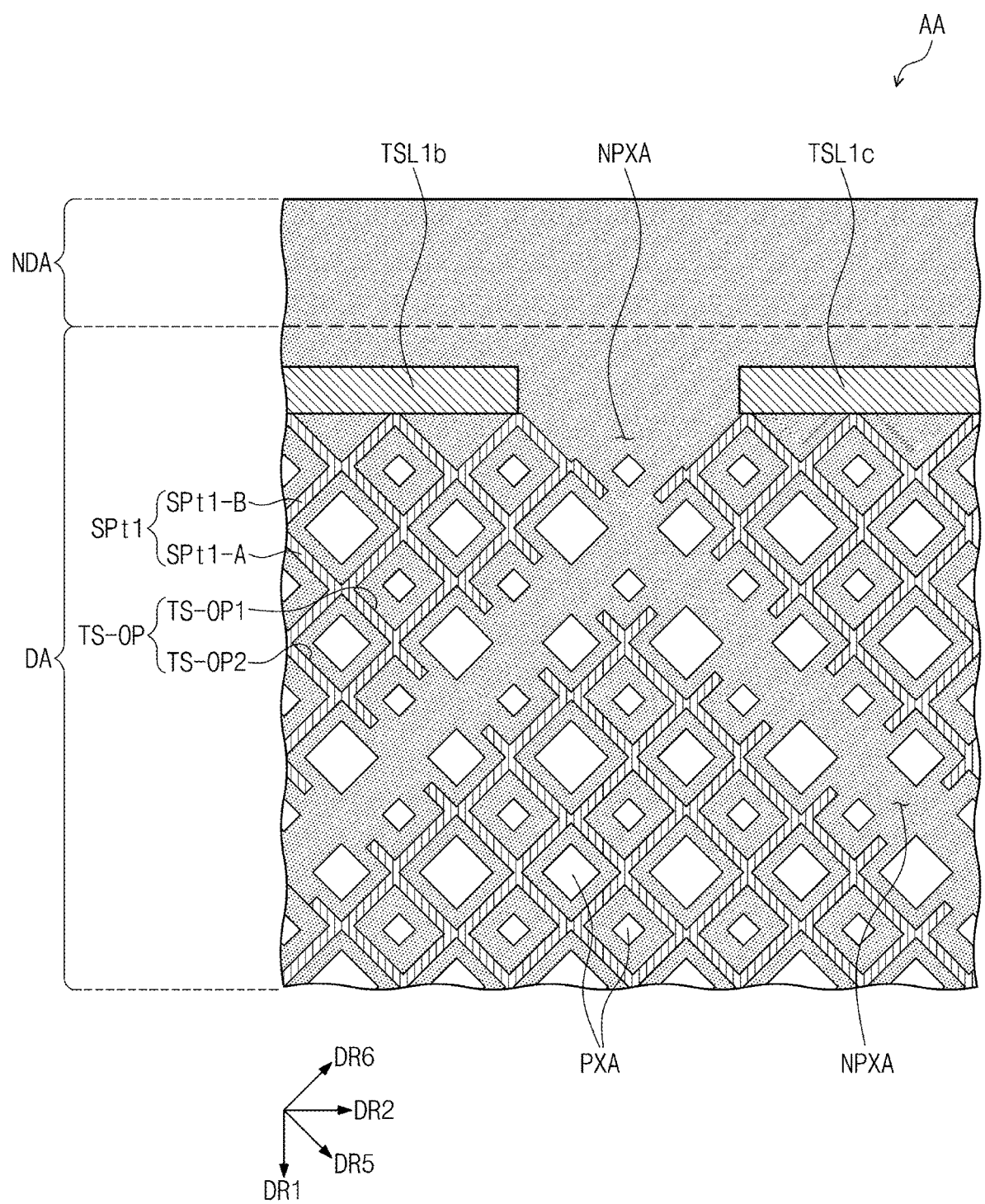
FIG. 7A is an enlarged view showing an area AA shown in FIG. 6E according to an exemplary embodiment of the invention.
Figure 7B:
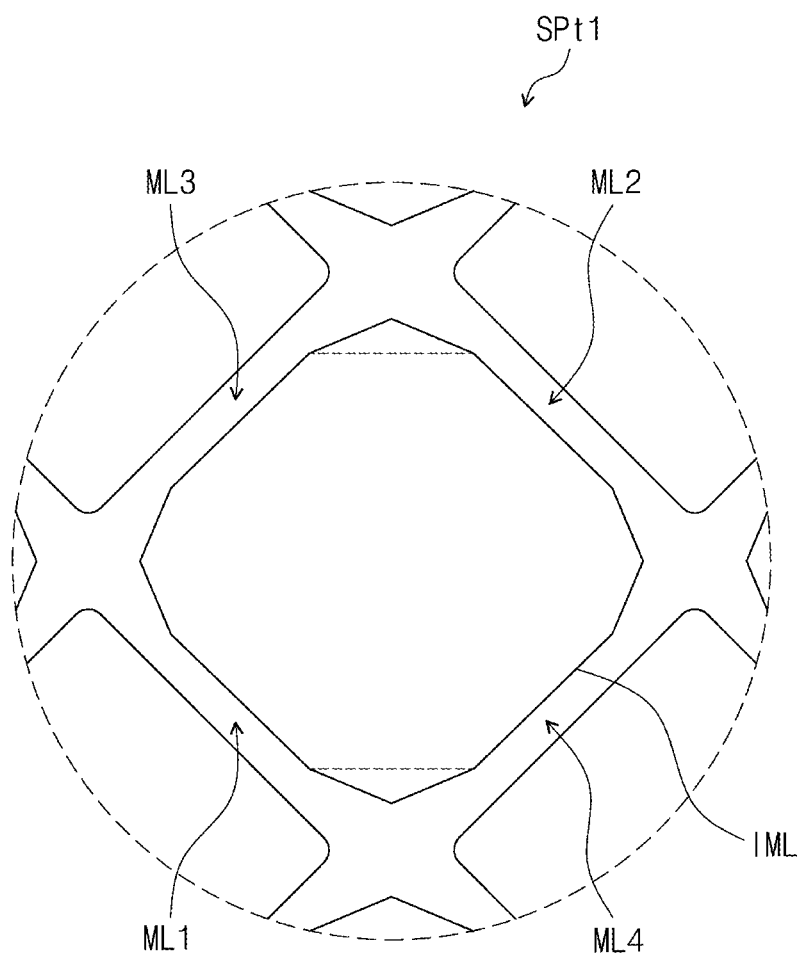
FIG. 7B is an enlarged view showing a sensor pattern shown in FIG. 7A according to an exemplary embodiment of the invention.
Figure 7C:
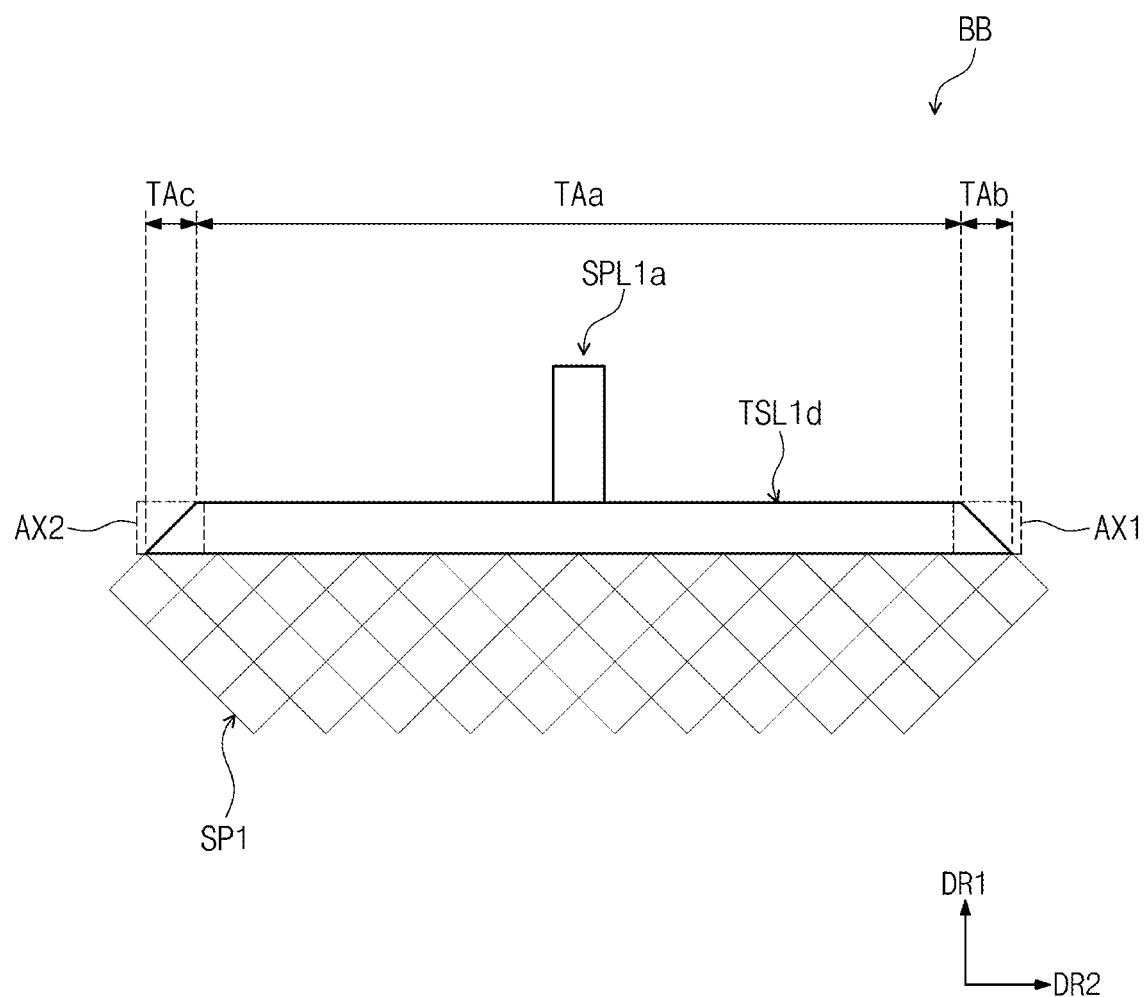
FIG. 7C is an enlarged view showing an area BB shown in FIG. 6E according to an exemplary embodiment of the invention.
Figure 7D:
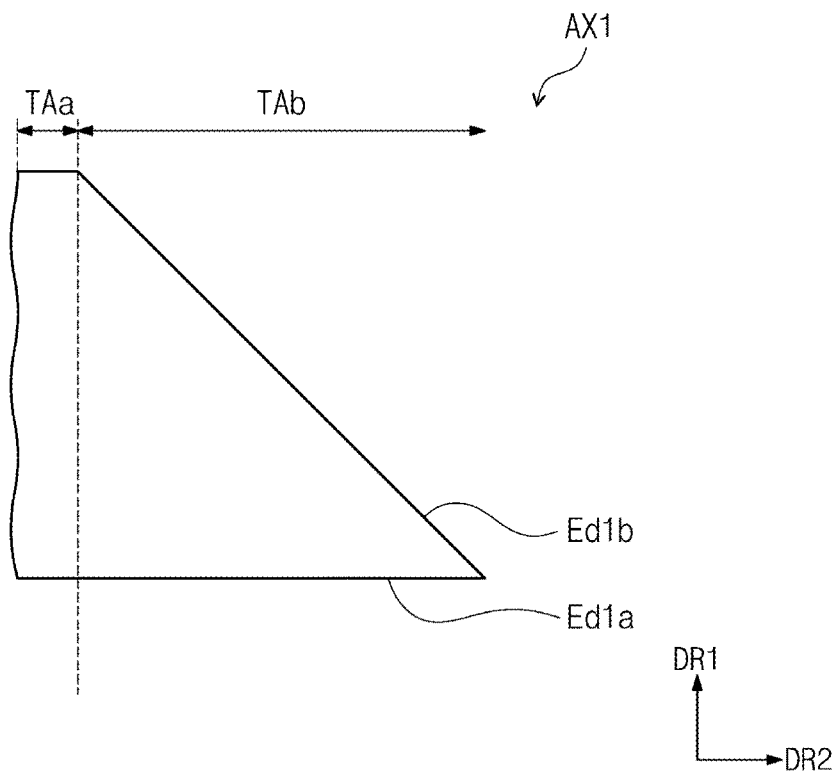
FIG. 7D is an enlarged view showing an area AX1 shown in FIG. 7C.
Figure 7E:
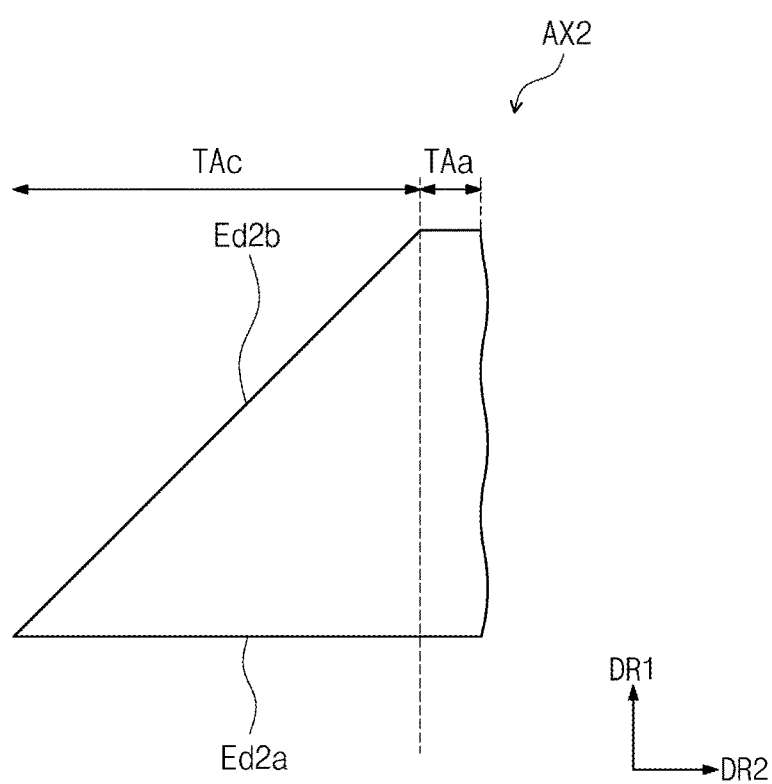
FIG. 7E is an enlarged view showing an area AX2 shown in FIG. 7C according to an exemplary embodiment of the invention.
Figure 7F:
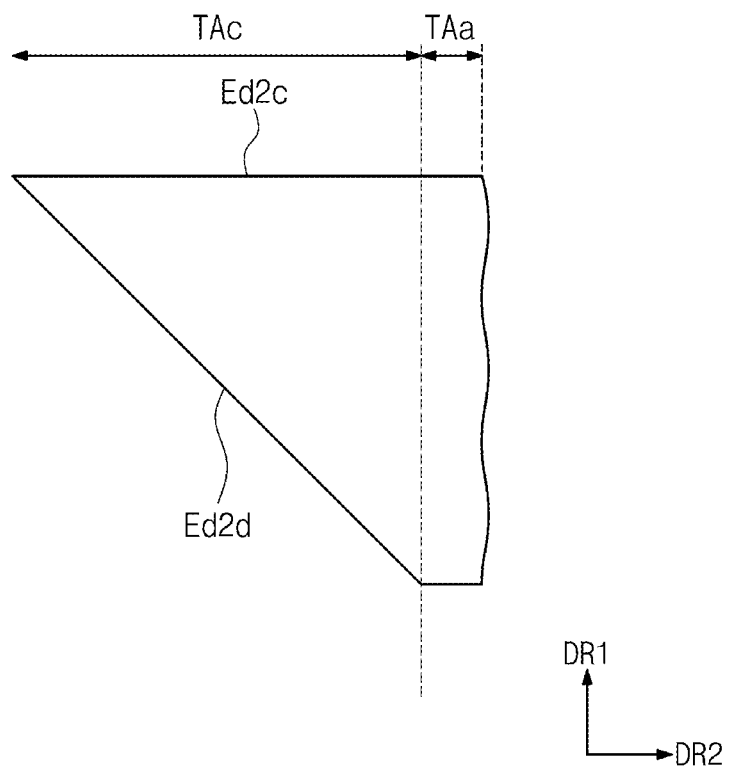
FIG. 7F is an enlarged view showing an area AX2 shown in FIG. 7C according to an exemplary embodiment of the invention.
Figure 7G:
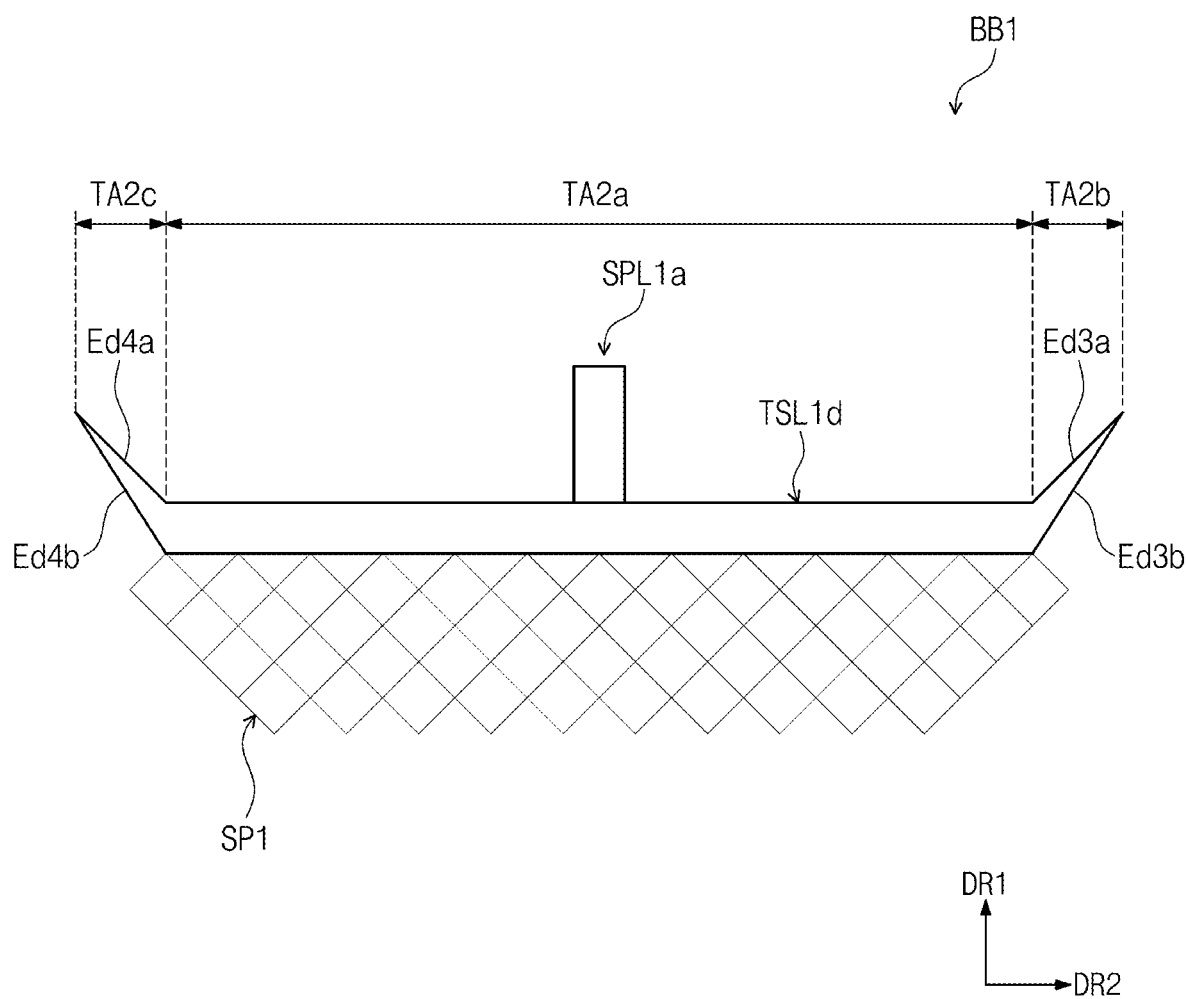
FIG. 7G and FIG. 7H are enlarged views showing an area BB shown in FIG. 6E according to an exemplary embodiment of the invention.
Figure 7H:
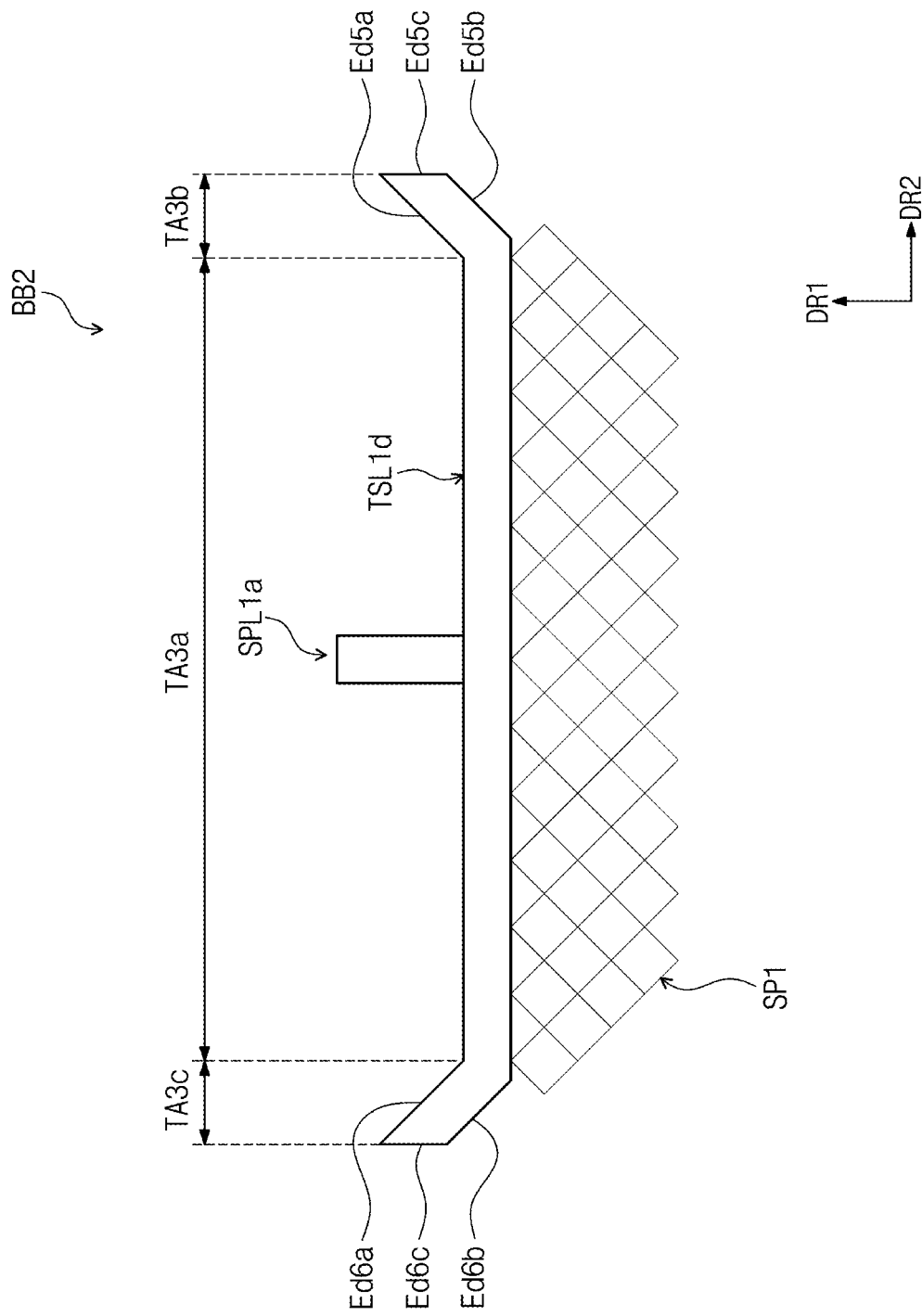

FIG. 7A is an enlarged view showing an area AA shown in FIG. 6E according to an exemplary embodiment of the present disclosure. FIG. 7B is an enlarged view showing a sensor pattern shown in FIG. 7A according to an exemplary embodiment of the present disclosure. FIG. 7C is an enlarged view showing an area BB shown in FIG. 6E according to an exemplary embodiment of the present disclosure. FIG. 7D is an enlarged view showing an area AX1 shown in FIG. 7C. FIG. 7E is an enlarged view showing an area AX2 shown in FIG. 7C according to an exemplary embodiment of the present disclosure. FIG. 7F is an enlarged view showing an area AX2 shown in FIG. 7C according to an exemplary embodiment of the present disclosure. FIGS. 7G and 7H are enlarged views showing an area BB shown in FIG. 6E according to an exemplary embodiment of the present disclosure.

Referring to FIG. 7A, each of the first touch sensors and the second touch sensors shown in FIG. 6B include a plurality of mesh lines SPt1 to define a plurality of mesh openings TS-OP. Each mesh line SPt1 includes two first extension parts SPt1-A extending in a fifth direction DR5 crossing the first direction DR1 and the second direction DR2 and two second extension parts SPt1-B extending in a sixth direction DR6 crossing the fifth direction DR5. The first extension parts SPt1-A face each other and are connected to the second extension parts SPt1-B. The second extension parts SPt1-B face each other and are connected to the first extension parts SPt1-A. Each mesh line has a line width of a few micrometers.

Meanwhile, the mesh openings TS-OP correspond to the light emitting areas PXA in a one-to-one correspondence, but they should not be limited thereto or thereby. That is, one mesh opening TS-OP may correspond to two or more light emitting areas PXA.

According to the present exemplary embodiment, the mesh openings TS-OP include first mesh openings TS-OP1 each having a first area and second mesh openings TS-OP2 each having a second area different from the first area.

The light emitting areas PXA may have various sizes. For instance, among the light emitting areas PXA, the size of the light emitting areas PXA emitting a first light may be different from the size of the light emitting areas PXA emitting a second light. As an example, the light emitting areas PXA emitting the first light, the light emitting areas PXA emitting the second light, and the light emitting areas PXA emitting the third light may have different sizes from each other.

However, each of the light emitting areas PXA may have the same size, and each of the mesh openings TS-OP may have the same size.

FIG. 7B shows one mesh line among the mesh lines SPt1. Referring to FIG. 7B, the mesh line SPt1 includes a first mesh line ML1 and a second mesh lines ML2, which correspond to the first extension parts SPt1-A. The mesh line SPt1 also includes a third mesh line ML3 and a fourth mesh line ML4, which correspond to the second extension parts SPt1-B.

One end of the first mesh line ML1 is connected to one end of the third mesh line ML3, and the other end of the first mesh line ML1 is connected to one end of the fourth mesh line ML4. One end of the second mesh line ML2 is connected to the other end of the third mesh line ML3, and the other end of the second mesh line ML2 is connected to the other end of the fourth mesh line ML4.

According to the present exemplary embodiment, an inner line IML of the mesh line SPt1 may be inclined with respect to the bending axis BX. Here, the inner line IML may be an inner edge of the mesh line SPt1 defining the mesh opening TS-OP. That is, since the inner line IML is inclined with respect to the bending axis BX, the mesh line SPt1 may have the shape inclined with respective to the bending axis BX. As a result, stress applied to the mesh line SPt1 in the bending area BA may be reduced.

FIG. 7C shows a connection electrode according to an exemplary embodiment of the present disclosure. The connection electrode shown in FIG. 7C may be substantially the same as the fourth connection electrode TSL1d shown in FIG. 6B. Hereinafter, for the convenience of explanation, the fourth connection electrode TSL1d will be described as the connection electrode TSL1d.

The connection electrode TSL1d includes a center portion TAa, a first edge portion TAb, and a second edge portion TAc. The center portion TAa makes contact with the one end of the first touch sensor disposed in the bending area BA among the first touch sensors. The first edge portion TAb is connected to one end of the center portion TAa. The second edge portion TAc is connected to the other end of the center portion TAa.

Referring to FIG. 7D, the first edge portion TAb according to the present exemplary embodiment includes a first edge Ed1a vertical to the bending axis BX and a second edge Ed1b inclined with the bending axis BX. That is, the first edge Ed1a is substantially parallel to the second direction DR2 and connected to the one end of the first touch sensor disposed in the bending area BA among the first touch sensors. The second edge Ed1b is connected to the first edge Ed1a and the center portion TAa.

Referring to FIG. 7E, the second edge portion TAc according to the present exemplary embodiment includes a third edge Ed2a vertical to the bending axis BX and a fourth edge Ed2b inclined with the bending axis BA. That is, the third edge Ed2a is substantially parallel to the second direction DR2 and connected to the one end of the first touch sensor disposed in the bending area BX among the first touch sensors. The fourth edge Ed2b is connected to the third edge Ed2a and the center portion TAa.

In addition, according to the present exemplary embodiment, the first edge portion TAb and the second edge portion TAc may be symmetrical with each other with respect to the center portion TAa, but they should not be limited thereto. That is, the first edge portion TAb and the second edge portion TAc may have different shapes from each other. As an example, the first edge portion of the connection electrode is disposed in the flat area NBA, and the second edge portion of the connection electrode is disposed in the bending area BA. In this case, the shape of the first edge portion disposed in the flat area NBA may be different from the shape of the second edge portion disposed in the bending area BA.

Further, according to the present exemplary embodiment, a slope of the second edge Ed1b with respect to the bending axis BX may be equal to a slope of the second mesh line ML2 shown in FIG. 7B. A slope of the fourth edge Ed2b with respect to the bending axis BX may be equal to a slope of the third mesh line ML3 shown in FIG. 7B.

FIG. 7F shows one edge portion of opposite edge portions of a connection electrode according to another exemplary embodiment of the present disclosure.

Referring to FIG. 7F, a third edge Ed2c is substantially parallel to the second direction DR2 and connected to a fourth edge Ed2d and a center portion TAa. A fourth edge Ed2d is inclined with respect to the bending axis BX and connected to the third edge Ed2c and the center portion TAa. In this case, each of the third and fourth edges Ed2c and Ed2d is spaced apart from the one end of the first touch sensor.

A first end of the third edge Ed2c is connected to a first end of the fourth edge Ed2d, and a second end of the third edge Ed2c is connected to the center portion TAa. A second end of the fourth edge Ed2d is connected to the center portion TAa, and a first end of the fourth edge Ed2d is connected to the third edge Ed2c.

FIGS. 7G and 7H show a connection electrode different from the connection electrode TSL1d shown in FIG. 7C. The connection electrode TSL1d shown in FIGS. 7G and 7H may have substantially the same structure as the connection electrode TSL1d shown in FIG. 7C except for shapes of the first and second edge portions TAb and TAc. Accordingly, the shapes of the first and second edge portions will be described in detail with reference to FIGS. 7G and 7H.

Referring to FIG. 7G, the connection electrode TSL1d includes a center portion TA2a, a first edge portion TA2b, and a second edge portion TA2c.

According to the present exemplary embodiment, the first edge portion TA2b includes a fifth edge Ed3a and a sixth edge Ed3b. The second edge portion TA2c includes a seventh edge Ed4a and an eighth edge Ed4b.

In particular, the fifth and sixth edges Ed3a and Ed3b may be inclined with respect to the bending axis BX. That is, one end of the fifth edge Ed3a is connected to one end of the sixth edge Ed3b, and the other end of the fifth edge Ed3a is connected to the center portion TA2a. One end of the sixth edge Ed3b is connected to the one end of the fifth edge Ed3a, and the other end of the sixth edge Ed3b is connected to the center portion TA2a.

As described above, since the one end of the fifth edge Ed3a is connected to the one end of the sixth edge Ed3b, each of the fifth edge Ed3a and the sixth edge Ed3b is spaced apart from the one end of the first touch sensor and inclined with respect to the bending axis BX.

In addition, the seventh and eighth edges Ed4a and Ed4b may be inclined with respect to the bending axis BX. That is, one end of the seventh edge Ed4a is connected to one end of the eighth edge Ed4b, and the other end of the seventh edge Ed4a is connected to the center portion TA2a. One end of the eighth edge Ed4b is connected to the one end of the seventh edge Ed4a, and the other end of the eighth edge Ed4b is connected to the center portion TA2a.

As described above, since the one end of the seventh edge Ed4a is connected to the one end of the eighth edge Ed4b, each of the seventh edge Ed4a and the eighth edge Ed4b is spaced apart from the one end of the first touch sensor and inclined with respect to the bending axis BX.

Referring to FIG. 7H, the connection electrode TSL1d includes a center portion TA3a, a first edge portion TA3b, and a second edge portion TA3c.

The first edge portion TA3b includes a ninth edge Ed5a, a tenth edge Ed5b, and an eleventh edge Ed5c. The eleventh edge Ed5c connects the ninth edge Ed5a and the tenth edge Ed5b.

According to the present exemplary embodiment, the ninth and tenth edges Ed5a and Ed5b may be inclined with respect to the bending axis BX, and the eleventh edge Ed5c may be parallel to the bending axis BX. However, the eleventh edge Ed5c may be inclined with respect to the bending axis BX according to another embodiment. That is, since the ninth to eleventh edges Ed5a to Ed5c according to the present exemplary embodiment are not vertical to the bending axis BX, the stress applied to the ninth to eleventh edges Ed5a to Ed5c in the bending area BA may be reduced.

The second edge portion TA3c includes a twelfth edge Ed6a, a thirteenth edge Ed6b, and a fourteenth edge Ed6c. The fourteenth edge Ed6c connects the twelfth edge Ed6a and the thirteenth edge Ed6b.

According to the present exemplary embodiment, the twelfth and thirteenth edges Ed6a and Ed6b may be inclined with respect to the bending axis BX, and the fourteenth edge Ed6c may be parallel to the bending axis BX. However, the fourteenth edge Ed6c may be inclined with respect to the bending axis BX according to another embodiment. That is, since the twelfth to fourteenth edges Ed6a to Ed6c according to the present exemplary embodiment are not vertical to the bending axis BX, the stress applied to the twelfth to fourteenth edges Ed6a to Ed6c in the bending area BA may be reduced.

As described above, the edge portions of the connection electrode disposed in the bending area BA include the edge inclined with respect to the bending axis BX. Accordingly, the stress applied to the edge portions of the connection electrode is reduced, a fracture, which may result from the bending of the display device DD, may be prevented from occurring in opposite ends of the connection electrode.

However, the shapes of the edge portions of the connection electrode should not be limited to those described with reference to FIG. 7C to FIG. 7H. That is, the shapes of the edge portions of the connection electrode may be changed in various ways with respect to the bending axis BX in the bending area BA.

In addition, as an example, one edge portion of the edge portions of the connection electrode has the shape shown in FIG. 7D, and the other edge portion of the edge portions of the connection electrode has the shape shown in FIG. 7F. That is, the edge portions of the connection electrode may be provided in various shapes.

Figure 8A:
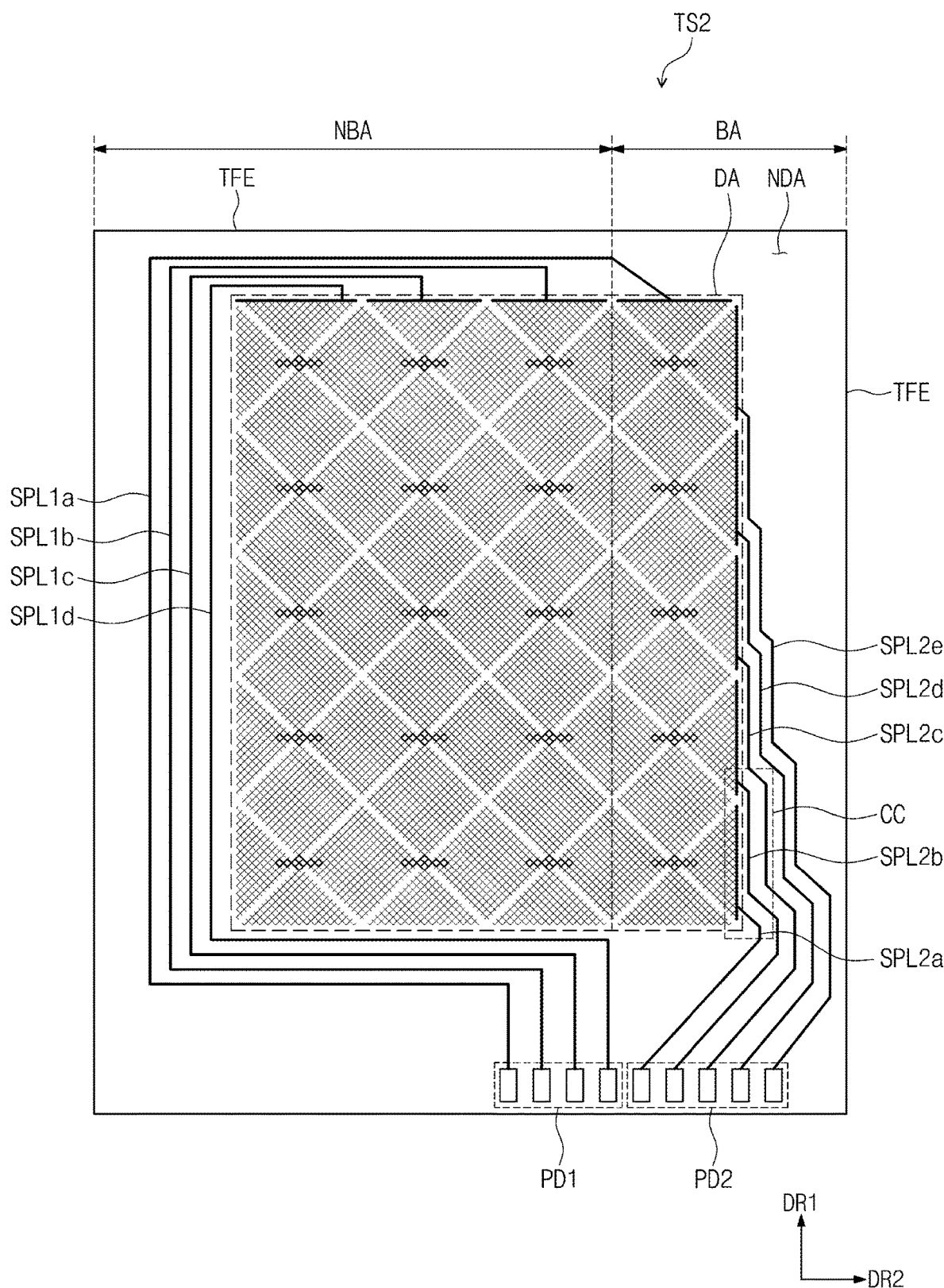
FIG. 8A is a plan view showing an input sensing unit according to another exemplary embodiment of the present disclosure.
Figure 8B:
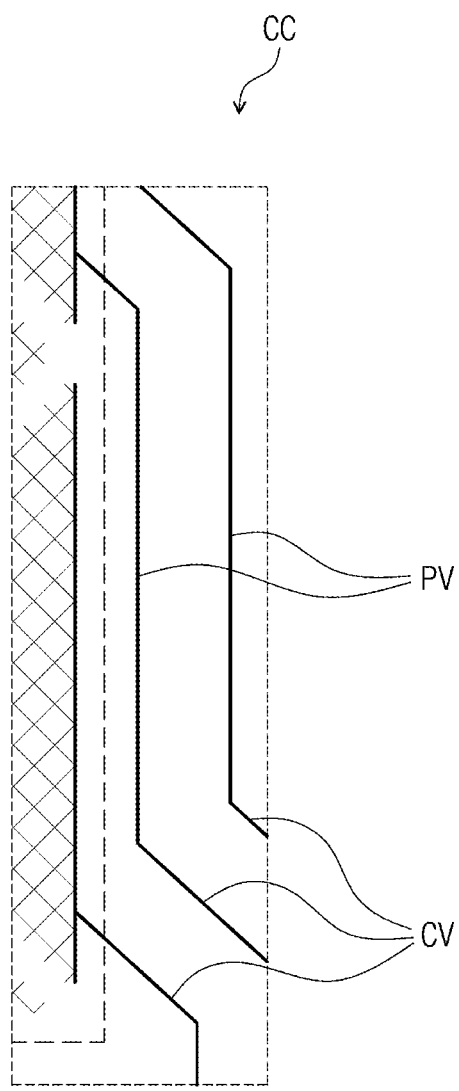
FIG. 8B is an enlarged view showing an area CC shown in FIG. 8A according to an exemplary embodiment of the invention.

FIG. 8A is a plan view showing an input sensing unit TS2 according to another exemplary embodiment of the present disclosure, and FIG. 8B is an enlarged view showing an area CC shown in FIG. 8A according to an exemplary embodiment of the present disclosure.

The input sensing unit TS2 shown in FIG. 8A has the same structure and function as those of the input sensing unit TS1 shown in FIG. 6B except for the structure of the touch signal lines. Accordingly, the touch signal lines will be described in detail, and the others will be omitted.

Referring to FIGS. 8A and 8B, portions of touch signal lines disposed in the bending area BA among first touch signal lines SPL1a to SPL1d and second touch signal lines SPL2a to SPL2e may be inclined with respect to the bending axis BX.

In detail, as shown in FIG. 8A, touch signal lines extending in the second direction DR2 perpendicular to the bending axis BX are disposed in the flat area NBA. In this case, since the flat area NBA is not bent, stress is not applied to the touch signal lines. On the contrary, in the case that the touch signal lines extending in the second direction DR2 are disposed in the bending area BA, stress may be applied to the touch signal lines.

Hereinafter, a structure in which the first first touch signal line SPL1a and the second touch signal lines are disposed in the bending area BA will be described. However, the structure in which the touch signal lines are disposed in the bending area BA may be changed in various ways depending on the connection structure of the connection electrodes.

According to the present exemplary embodiment, the touch signal line disposed in the bending area BA among the touch signal lines may be inclined with respect to the bending axis BX. As an example, a portion of the first first touch signal lines SPL1a disposed in the flat area NBA extends along the second direction DR2. In this case, stress is not applied to the first touch signal lines SPL1a.

The portion of the first first touch signal lines SPL1a disposed in the bending area BA is inclined with respect to the bending axis BX and connected to the connection electrode disposed in the bending area BA among the first connection electrodes.

In particular, as shown in FIG. 8B, the touch signal lines disposed in the bending area BA among the touch signal lines includes an inclination portion CV inclined with respect to the bending axis BX and a parallel portion PV parallel to the bending axis BX.

As described above, the touch signal lines according to the present disclosure are inclined with respect to or parallel to the bending axis BX in the bending area BA, and thus, an intensity of the stress applied to the touch signal lines may be reduced.

Figure 9:
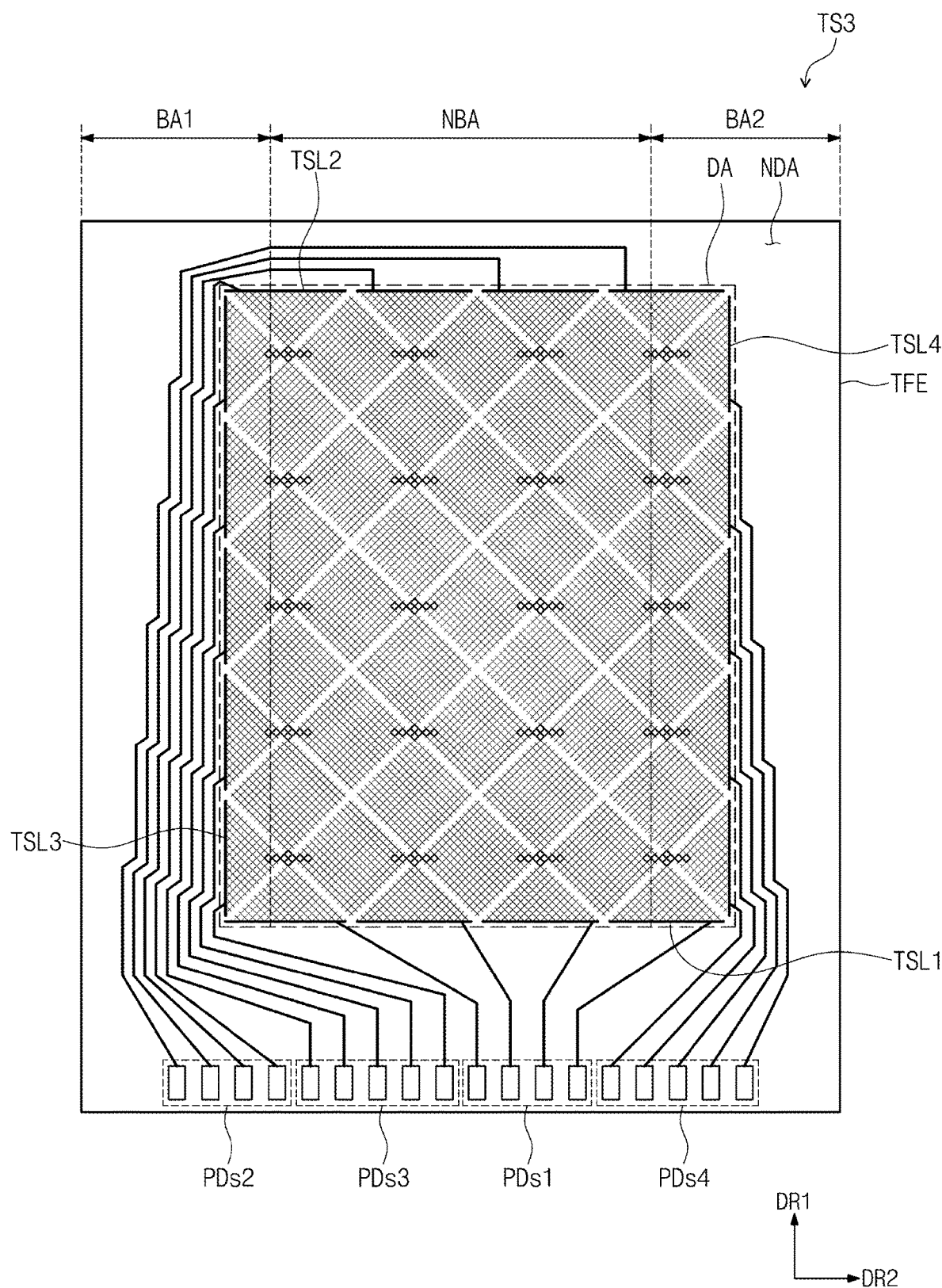
FIG. 9 is a plan view showing an input sensing unit according to another exemplary embodiment of the invention.

FIG. 9 is a plan view showing an input sensing unit TS3 according to another exemplary embodiment of the present disclosure.

The input sensing unit TS3 shown in FIG. 9 has the same structure and function as those of the input sensing unit TS shown in FIG. 6B except for structures of touch signal lines and connection electrodes. Accordingly, the structures of the touch signal lines and the connection electrodes will be described in detail, and details of the others will be omitted.

Referring to FIG. 9, the connection electrodes are connected to one ends and the other ends of the first touch sensors. In detail, first connection electrodes TSL1 are respectively connected to the one ends of the first touch sensors, and second connection electrodes TSL2 are respectively connected to the other ends of the first touch sensors. Third connection electrodes TSL3 are respectively connected to the one ends of the second touch sensors, and fourth connection electrodes TSL4 are respectively connected to the other ends of the second touch sensors.

The first touch signal lines are connected to a first pad part PDs1 and the first connection electrodes TSL1 to apply an electrical signal output from the first pad part PDs1 to the first connection electrode TSL1. The second touch signal lines are connected to a second pad part PDs2 and the second connection electrodes TSL2 to apply an electrical signal output from the second pad part PDs2 to the second connection electrode TSL2. The third touch signal lines are connected to a third pad part PDs3 and the third connection electrodes TSL3 to apply an electrical signal output from the third pad part PDs3 to the third connection electrode TSL3. The fourth touch signal lines are connected to a fourth pad part PDs4 and the fourth connection electrodes TSL4 to apply an electrical signal output from the fourth pad part PDs4 to the fourth connection electrode TSL4.

As described with reference to FIG. 8B, the first to fourth touch signal lines disposed in the bending area BA may include an inclination portion CV inclined with respect to the bending axis BX and a parallel portion PV parallel to the bending axis BX.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
a base layer;
a buffer layer disposed on the base layer;
a display element layer disposed on the buffer layer and comprising a plurality of pixels, each of the pixels comprising an anode electrode, a cathode electrode, and a light emitting layer between the anode electrode and the cathode electrode;
an encapsulation layer disposed on the display element layer and covering the pixels;
a plurality of touch sensors disposed directly on the encapsulation layer, each of the touch sensors comprising a plurality of conductive patterns having a mesh shape; and
a plurality of signal lines respectively connected to the touch sensors, and
wherein:
the conductive patterns comprise a plurality of mesh lines defining a plurality of mesh openings;
each of interior angles of one of the mesh openings is greater than 90 degrees;
the base layer comprises a bending area configured to bend about a bending axis; and
inner lines defining the one of the mesh openings are inclined with respect to the bending axis.

2. The display device of claim 1, wherein the one of the mesh openings comprises at least four of the inner lines.

3. The display device of claim 1, wherein each of signal lines disposed on the bending area among the signal lines comprises inclined portions with respect to the bending axis.

4. The display device of claim 3, wherein, for the signal lines disposed on the bending area, the farther each signal line is from the touch sensors, the greater the number of inclined portions.

5. The display device of claim 1, further comprising a connection electrode disposed between one of the signal lines and one of the conductive patterns, and the connection electrode is connected to the mesh lines,
wherein the connection electrode comprises an edge inclined with respect to the bending axis.

6. The display device of claim 1, wherein two of the mesh openings adjacent to each other have different shapes from each other.

7. The display device of claim 1, wherein two of the mesh openings adjacent to each other have different areas from each other.

8. A display device comprising:
a base layer;
a buffer layer disposed on the base layer;
a display element layer disposed on the buffer layer and comprising a plurality of pixels, each of the pixels comprising an anode electrode, a cathode electrode, and a light emitting layer between the anode electrode and the cathode electrode;

an encapsulation layer disposed on the display element layer and covering the pixels;

a plurality of touch sensors disposed directly on the encapsulation layer, each of the touch sensors comprising a plurality of mesh lines defining a plurality of mesh openings; and a plurality of signal lines respectively connected to the touch sensors, wherein:

two of the mesh openings adjacent to each other have different areas from each other;

the base layer comprises a bending area configured to bend about a bending axis; and inner lines defining one of the mesh openings are inclined with respect to the bending axis.

\* \* \* \* \*